(12) United States Patent
Williams

(10) Patent No.: US 9,441,681 B2
(45) Date of Patent: Sep. 13, 2016

(54) POWER TRANSMITTING DEVICE WITH OVERRUNNING DECOUPLER

(71) Applicant: LITENS AUTOMOTIVE PARTNERSHIP, Woodbridge (CA)

(72) Inventor: Warren Williams, Oakville (CA)

(73) Assignee: Litens Automotive Partnership, Woodbridge (CA)

(*) Notice: Subject to any disclaimer, the term of this patent is extended or adjusted under 35 U.S.C. 154(b) by 26 days.

(21) Appl. No.: 14/395,300

(22) PCT Filed: Apr. 18, 2013

(86) PCT No.: PCT/CA2013/000386
§ 371 (c)(1),
(2) Date: Oct. 17, 2014

(87) PCT Pub. No.: WO2013/155615
PCT Pub. Date: Oct. 24, 2013

(65) Prior Publication Data
US 2015/0075943 A1 Mar. 19, 2015

Related U.S. Application Data

(60) Provisional application No. 61/625,733, filed on Apr. 18, 2012.

(51) Int. Cl.
*F16D 41/20* (2006.01)
*F16H 55/36* (2006.01)
*B60K 25/02* (2006.01)
(Continued)

(52) U.S. Cl.
CPC ............. *F16D 41/20* (2013.01); *B60K 25/02* (2013.01); *F16D 13/08* (2013.01); *F16D 13/12* (2013.01); *F16D 13/76* (2013.01); *F16D 43/24* (2013.01); *F16H 7/20* (2013.01); *F16H 55/36* (2013.01);
(Continued)

(58) Field of Classification Search
CPC ................ F16H 2055/366; F16F 15/1216; F16D 41/20; F16D 13/76; F16D 43/24
See application file for complete search history.

(56) References Cited

U.S. PATENT DOCUMENTS

| | | | |
|---|---|---|---|
| 7,624,852 B2 * | 12/2009 | Mevissen | F16D 7/022 192/41 S |
| 7,712,592 B2 | 5/2010 | Jansen et al. | |
| 7,766,774 B2 * | 8/2010 | Antchak | F16D 7/022 192/41 S |
| 7,954,613 B2 | 6/2011 | Mevissen et al. | |
| 8,047,920 B2 | 11/2011 | Jansen et al. | |

(Continued)

OTHER PUBLICATIONS

International Search Report and Written Opinion for PCT/CA2013/000386, mailed Jul. 29, 2013; ISA/CA.

*Primary Examiner* — Richard Lorence
*Assistant Examiner* — David Morris
(74) *Attorney, Agent, or Firm* — Harness, Dickey & Pierce, P.L.C.

(57) ABSTRACT

A decoupler that includes a hub, a drive member and a one-way clutch and torsionally resilient coupling. The drive member is configured to engage an endless power transmitting element. The one-way clutch and torsionally resilient coupling is disposed in series in a torque path and has a carrier and a wrap spring. The carrier defines a groove. The wrap spring is formed of wire and has an engagement end and a plurality of helical coils. The engagement end is being shorter in overall length than a length of one of the helical coils. The engagement end is received in the groove. The carrier is received in a pocket formed in a rotary member that can be the hub, the drive member, or a component in a torque path between the hub and the drive member. An axial end face of the wire that forms the wrap spring is abutted against an edge of the pocket.

15 Claims, 20 Drawing Sheets

(51) Int. Cl.
*F16D 13/08* (2006.01)
*F16D 13/12* (2006.01)
*F16D 13/76* (2006.01)
*F16D 43/24* (2006.01)
*F16H 7/20* (2006.01)

(52) U.S. Cl.
CPC ........ *B60Y 2400/427* (2013.01); *F16D 41/206* (2013.01); *F16H 2055/366* (2013.01)

(56) References Cited

U.S. PATENT DOCUMENTS

| | | |
|---|---|---|
| 8,302,753 B2 | 11/2012 | Antchak et al. |
| 2009/0176608 A1 | 7/2009 | Jansen et al. |
| 2011/0315502 A1 | 12/2011 | Antchak et al. |
| 2012/0298474 A1* | 11/2012 | Ward ............... F16D 7/022 192/41 S |

* cited by examiner

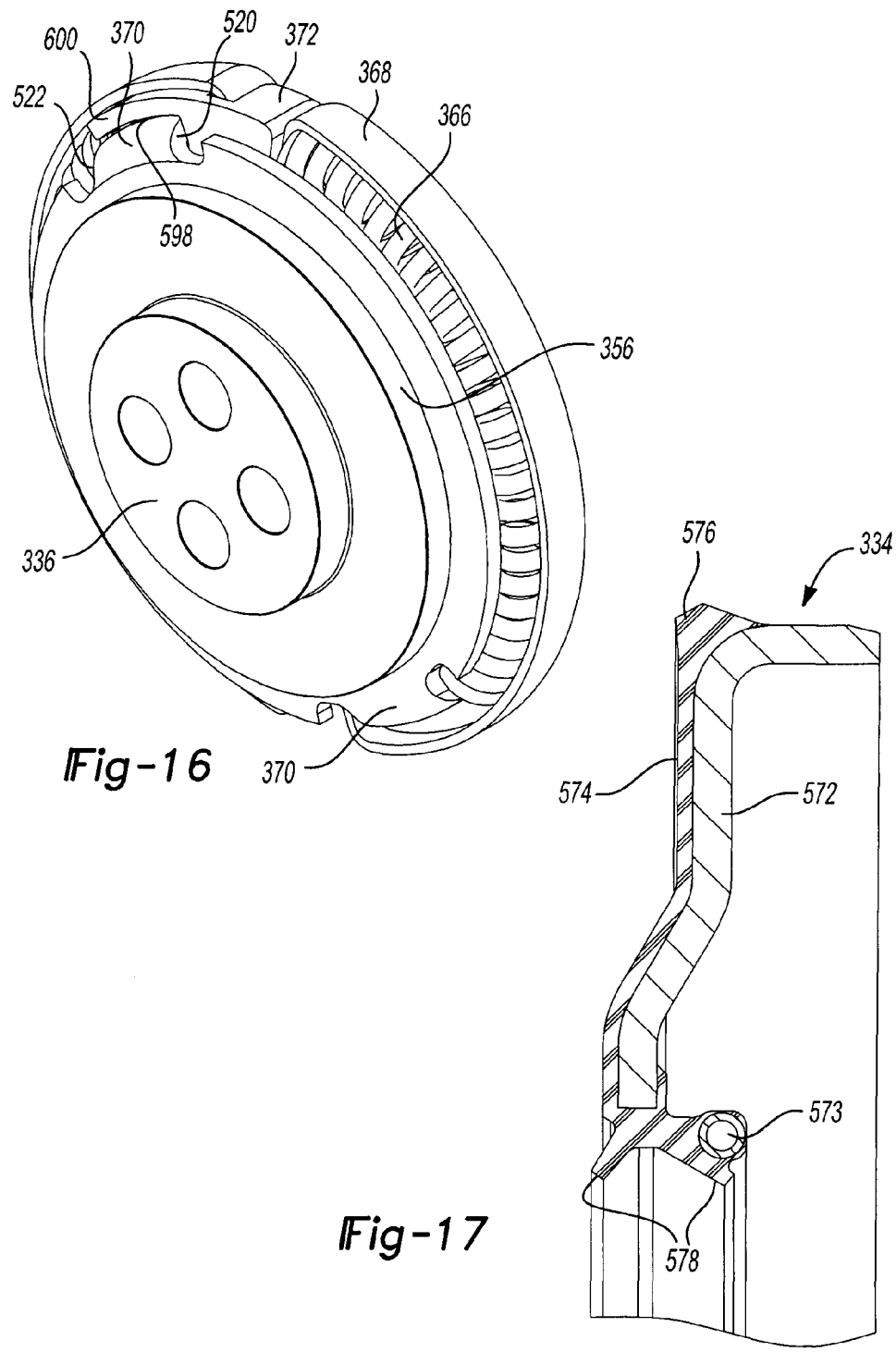

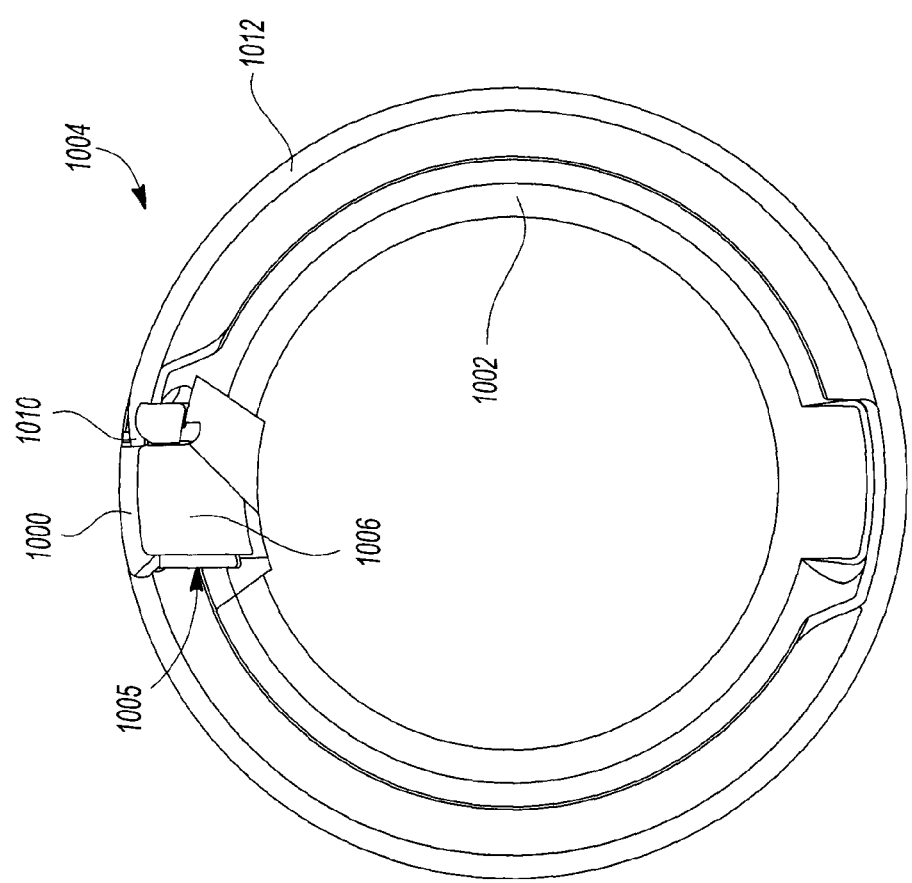

US 9,441,681 B2

POWER TRANSMITTING DEVICE WITH OVERRUNNING DECOUPLER

CROSS-REFERENCE TO RELATED APPLICATIONS

This application is a U.S. National Phase Application under 35 U.S.C. 371 of International Application No. PCT/CA2013/000386 filed on Apr. 18, 2013 and published as WO 2013/155615 A1 on Oct. 24, 2013. This application claims the benefit and priority of U.S. Provisional Patent Application Ser. No. 61/625,733 filed Apr. 18, 2012. The entire disclosures of all of the above applications are incorporated herein by reference.

FIELD

The present disclosure relates to a power transmitting device with overrunning decoupler and more specifically to a power transmitting device with overrunning decoupler having a one-way clutch assembly and a torsionally resilient coupling.

BACKGROUND

This section provides background information related to the present disclosure which is not necessarily prior art.

It is widely known in an automotive vehicle engine to transfer a portion of the engine output to a plurality of belt driven accessory components utilizing an endless serpentine belt. Typically, each component includes a pulley drivingly engaged with the belt and the belt is driven by an output pulley coupled directly to the crankshaft on the engine. The pulley of the component is rotatably mounted to a drive shaft. An example of such a belt driven accessory component is an alternator.

Internal combustion engines operate as a pulse system, constantly accelerating and decelerating and causing engine vibrations. As a result of these changing speeds, the belt driven accessory components, which are driven by the crankshaft, are continually trying to speed up and slow down. This can result in unacceptable levels of noise and vibration along with reduced component durability due to high fluctuating loads and vibrations. Additionally, rapid engine accelerations and decelerations, such as during transmission shifts and engine startup or shutdown, can cause belt squeal from slippage between the belt and the pulley, as well as heavy impact loading on the belt.

SUMMARY

This section provides a general summary of the disclosure, and is not a comprehensive disclosure of its full scope or all of its features.

In one form, the present teachings provide a decoupler that includes a hub, a drive member that is configured to engage an endless power transmitting element, and a one-way clutch and torsionally resilient coupling having a carrier, a wrap spring, a clutch surface, and at least one spring. The carrier defines a groove. The wrap spring is formed of wire and has an engagement end and a plurality of helical coils. The engagement end is received in the groove and is shorter in overall length than a length of one of the helical coils. The helical coils are engaged to the clutch surface and are wound such that when rotary power is transmitted from the one of the hub and the drive member to the other one of the hub and the drive member the helical coils tend to uncoil against the clutch surface. The carrier is received in a pocket formed in a rotary member that can be the hub, the drive member, or a component in a torque path between the hub and the drive member. An axial end face of the wire that forms the wrap spring is abutted against an edge of the pocket.

A decoupler with such a carrier is advantageous because: a) the foot (i.e., first end) of the wrap spring is held firmly and is kept from buckling when under load and 'pulls' the clutch out of engagement during overrun; b) when the carrier is loose fit with the hub (or other rotating component, such as a carrier member), it allows the wrap spring some compliance, allowing it to move freely and ground itself to the pulley or a clutching feature; and/or c) it avoids overly restricting movement of the wrap spring—restricting wrap spring movement too much can result in bending moments and areas of stress concentration that may lead to fractures of the wrap spring and/or the carrier.

In another form, the present teachings provide a decoupler that includes a hub, a drive member and a one-way clutch and torsionally resilient coupling. The drive member is configured to engage an endless power transmitting element. The one-way clutch and torsionally resilient coupling are disposed in series in a torque path. The one-way clutch and torsionally resilient coupling have a carrier, a wrap spring, a clutch housing, a spring support, and at least one spring. The carrier is received in a pocket formed in the hub. The pocket does not extend fully about the hub. The carrier defines a groove. The wrap spring is formed of wire and has an engagement end and a plurality of helical coils. The engagement end is shorter in overall length than a length of one of the helical coils. The engagement end is received in the groove and is positioned relative to the hub such that an axial end face of the wire that forms the wrap spring is abutted against an edge of the pocket. The carrier housing includes a clutch surface and a first spring tab. The clutch surface is disposed radially inwardly of the at least one spring. The helical coils of the wrap spring are engaged to the clutch surface. The helical coils of the wrap spring are wound such that when rotary power is transmitted from one of the hub and the drive member to the other one of the hub and the drive member the helical coils tend to uncoil against the clutch surface. The spring support is fixedly coupled to the other one of the hub and the drive member and has a second spring tab. The at least one spring is disposed between the first and second spring tabs such that rotary power transmitted between the first and second spring tabs is transmitted through the at least one spring.

In another form, the present teachings provide a decoupler that includes a hub, a drive member and a one-way clutch and torsionally resilient coupling. The drive member is configured to engage an endless power transmitting element. The one-way clutch and torsionally resilient coupling is disposed in series in a torque path and has a carrier and a wrap spring, the carrier is received in a pocket formed in the hub, the pocket does not extend fully about the hub. The carrier defines a groove. The wrap spring is formed of wire and has an engagement end and a plurality of helical coils. The engagement end is being shorter in overall length than a length of one of the helical coils. The engagement end is received in the groove and is positioned relative to the hub such that an axial end face of the wire that forms the wrap spring is abutted against an edge of the pocket.

In still another form, the present teachings provide a decoupler that includes a hub, a drive member, a one-way clutch and an anti-ramp-up device. The drive member is configured to engage an endless power transmitting element.

The one-way clutch has a wrap spring, a clutch housing, a spring support, and at least one spring. The wrap spring is formed of wire and has an engagement end and a plurality of helical coils. The engagement end is shorter in overall length than a length of one of the helical coils. The engagement end has an axial end face that is abutted against the one of the hub and the drive member such that rotary power is transmitted between the engagement end and the one of the hub and the drive member through the axial end face of the wire that forms the wrap spring. The carrier housing includes a clutch surface and a first spring tab. The clutch surface is disposed radially inwardly of the at least one spring. The helical coils of the wrap spring are engaged to the clutch surface. The helical coils of the wrap spring are wound such that when rotary power is transmitted from the one of the hub and the drive member to the other one of the hub and the drive member the helical coils tend to uncoil against the clutch surface. The spring support is fixedly coupled to the other one of the hub and the drive member and has a second spring tab. The at least one spring is a torsion spring that is formed of wire. The torsion spring has a first spring endface abutted against the first spring tab and a second spring endface abutted against the second spring tab such that rotary power transmitted between the first and second spring tabs is transmitted through the wire of the torsion spring. The anti-ramp-up device includes a leg and a stop. The leg is fixedly coupled to one of the clutch housing and the spring support. The stop is formed on the other one of the clutch housing and the spring support. The anti-ramp-up device limits relative rotation between the clutch housing and the spring support to inhibit disengagement of the first spring tab from the first spring endface, disengagement of the second spring tab from the second spring endface, or disengagement of both the first and second spring tabs from the first and second spring endfaces.

The decoupler can further be configured such that: (a) the stop includes a resilient bumper that is contacted by the leg when no rotary load is transmitted through the decoupler; (b) the resilient bumper is fixedly coupled to a thrust bushing that abuts the clutch housing; and/or (c) a slot is formed in the other one of the clutch housing and the spring support and the stop is associated with an end of the slot.

In a further form, the present disclosure provides a decoupler that includes a hub, a drive member, and a one-way clutch. The drive member is configured to engage an endless power transmitting element. The one-way clutch has a wrap spring, a clutch housing, a spring support, at least one spring, and a clutch housing bushing. The wrap spring is formed of wire and has an engagement end, a plurality of helical coils, and a second end. The engagement end is disposed on a first axial end of the wrap spring and is shorter in overall length than a length of one of the helical coils. The engagement end has an axial end face that is abutted against the one of the hub and the drive member such that rotary power is transmitted between the engagement end and the one of the hub and the drive member through the axial end face of the wire that forms the wrap spring. The second end is disposed on a second axial end of the wrap spring that is opposite to the first end. The carrier housing includes a clutch surface and a first spring tab. The clutch surface is disposed radially inwardly of the at least one spring. The helical coils of the wrap spring are engaged to the clutch surface and are wound such that when rotary power is transmitted from the one of the hub and the drive member to the other one of the hub and the drive member the helical coils tend to uncoil against the clutch surface. The spring support is fixedly coupled to the other one of the hub and the drive member and has a second spring tab. The at least one spring is disposed between the first and second spring tabs such that rotary power transmitted between the first and second spring tabs is transmitted through the at least one spring. The clutch housing bushing is non-rotatably coupled to the clutch housing and supports the clutch housing relative to one of the drive member and the spring support. The clutch housing bushing is positioned proximate the second end of the wrap spring to limit axial elongation of the wrap spring.

The decoupler can further be configured such that: (a) the second end of the wrap spring co-extends with a last one of the plurality of helical coils, and a gap is disposed between the last one of the plurality of helical coils and an adjacent one of the plurality of helical coils, the gap is sized such that contact between the last one of the plurality of helical coils and the clutch housing bushing is disposed in a plane that is perpendicular to a rotational axis of the hub; (b) at least one tooth is formed on an axial end of the clutch housing and the clutch housing bushing is complementary to the axial end of the clutch housing; (c) the clutch housing includes a tubular portion and a flange that extends radially outwardly from the tubular portion, the tubular portion defines the clutch surface and the first spring tab is coupled to the flange; and/or (d) the clutch housing is formed of sheet metal, a slit is formed in the flange and a portion of the flange on a first circumferential side of the slit is deformed in an axial direction to define the first spring tab.

In another form, the present teachings provide a decoupler that includes a hub, a drive member and a one-way clutch. The drive member is configured to engage an endless power transmitting element. The one-way clutch has a wrap spring, a clutch housing, a spring support, and at least one spring. The wrap spring is formed of wire and has an engagement end, a plurality of helical coils, and a second end. The engagement end is disposed on a first axial end of the wrap spring and is shorter in overall length than a length of one of the helical coils. The engagement end has an axial end face that is abutted against the one of the hub and the drive member such that rotary power is transmitted between the engagement end and the one of the hub and the drive member through the axial end face of the wire that forms the wrap spring. The second end is disposed on a second axial end of the wrap spring that is opposite to the first end. The carrier housing includes a clutch surface and a first spring tab. The clutch surface is disposed radially inwardly of the at least one spring. The helical coils of the wrap spring are engaged to the clutch surface and are wound such that when rotary power is transmitted from the one of the hub and the drive member to the other one of the hub and the drive member the helical coils tend to uncoil against the clutch surface. The spring support is fixedly coupled to the other one of the hub and the drive member and has a second spring tab. The at least one spring is disposed between the first and second spring tabs such that rotary power transmitted between the first and second spring tabs is transmitted through the at least one spring. Each of the spring seat and the drive member is a discrete component. The spring seat is fixedly coupled to the drive member.

The decoupler can further be configured such that: (a) the spring seat is welded to the drive member; (b) the spring seat is formed of sheet metal; and/or (c) the drive member is formed of a material that is different than a material from which the spring seat is formed.

In still another form, the present teachings provide a decoupler that includes a hub, a drive member that is configured to engage an endless power transmitting element, and a one-way clutch and resilient coupling. The one-way clutch has a wrap spring, a clutch housing, a spring support, and at least one spring. The wrap spring is formed of wire and has an engagement end, a plurality of helical coils, and a second end. The engagement end is disposed on a first axial end of the wrap spring and is shorter in overall length than a length of one of the helical coils. The engagement end has an axial end face that is abutted against the hub such that rotary power is transmitted between the engagement end and the hub through the axial end face of the wire that forms the wrap spring. The second end is disposed on a second axial end of the wrap spring that is opposite to the first end. The carrier housing includes a clutch surface and a first spring tab. The clutch surface is disposed radially inwardly of the at least one spring. The helical coils of the wrap spring are engaged to the clutch surface. The helical coils of the wrap spring are wound such that when rotary power is transmitted from one of the hub and the drive member to the other one of the hub and the drive member, the helical coils tend to uncoil against the clutch surface. The spring support is fixedly coupled to the drive member and has a second spring tab. The at least one spring is disposed between the first and second spring tabs such that rotary power transmitted between the first and second spring tabs is transmitted through the at least one spring. Each of the spring seat and the drive member is a discrete component and the spring seat is fixedly coupled to the drive member.

The decoupler can further be configured such that: (a) the spring seat is welded to the drive member; (b) the spring seat is formed of sheet metal; and/or (c) the drive member is formed of a material that is different than a material from which the spring seat is formed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure in any way. Similar or identical elements are given consistent identifying numerals throughout the various figures.

FIG. 16 is a front perspective view of the overrunning decoupler of FIG. 11 shown with the seal cap and pulley removed for illustrative purposes;

FIG. 17 is a partial longitudinal section view of the seal cap of the overrunning decoupler of FIG. 11;

FIG. 23 is a front elevation view of another overrunning decoupler constructed in accordance with the teachings of the present disclosure;

Corresponding reference numerals indicate corresponding parts throughout the several views of the drawings.

DETAILED DESCRIPTION

Example embodiments will now be described more fully with reference to the accompanying drawings.

Figure 1:
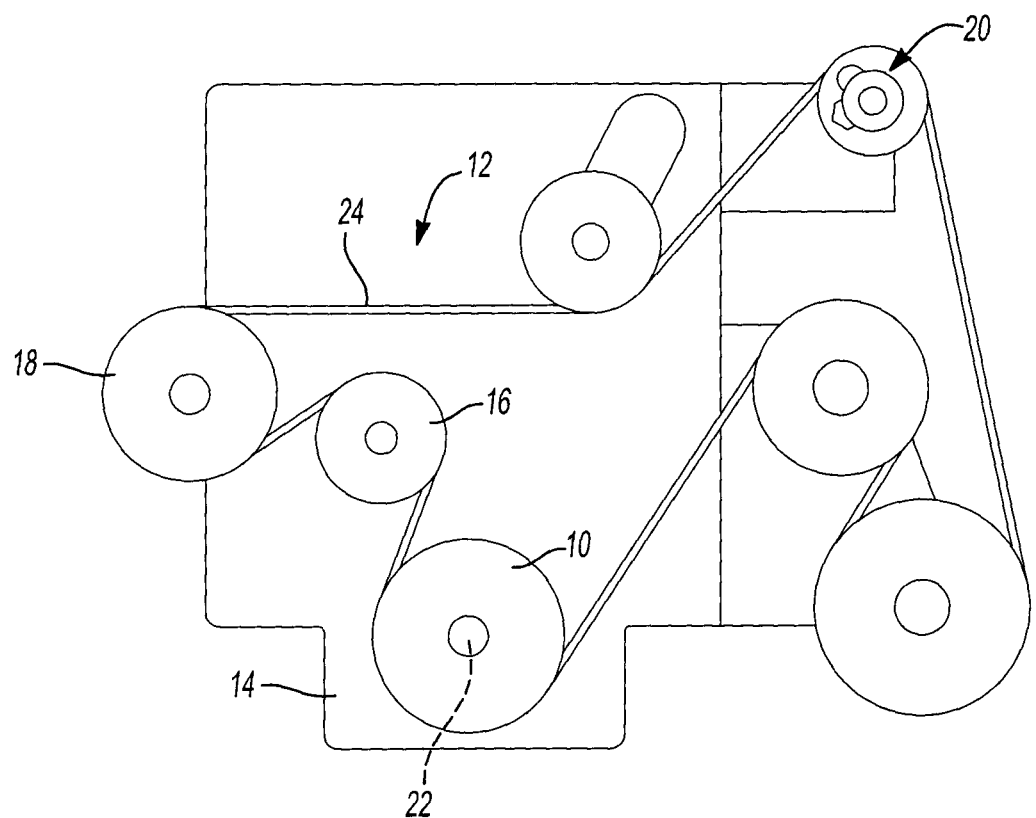
FIG. 1 is a schematic illustration of a first exemplary overrunning decoupler constructed in accordance with the teachings of the present disclosure and shown in operative association with an internal combustion engine.

With reference to FIG. 1 of the drawings, a first overrunning decoupler constructed in accordance with the teachings of the present disclosure is generally indicated by reference numeral 10. The overrunning decoupler 10 is employed in a front engine accessory drive 12 of an internal combustion engine 14. The front engine accessory drive 12 includes a plurality of engine accessories, such as a water pump 16, an air conditioning compressor 18, and a starter/generator or starter/alternator 20 that is driven by a crankshaft 22 of the engine 14 via a belt 24 and the overrunning decoupler 10.

Figure 2:
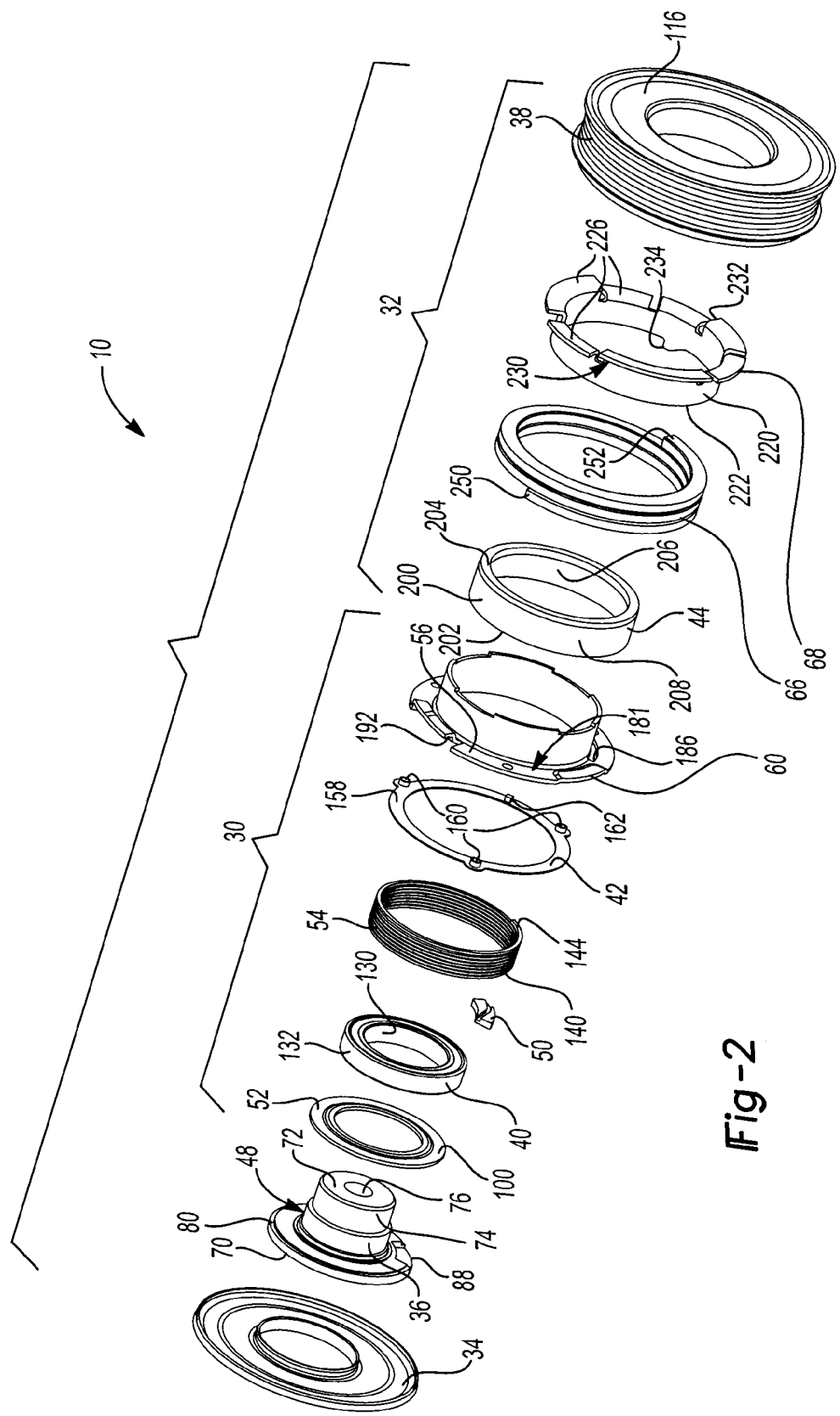
FIG. 2 is an exploded rear perspective view of the overrunning decoupler of FIG. 1.

With reference now to FIGS. 1-2, the overrunning decoupler 10 will be described in greater detail. The overrunning decoupler 10 generally comprises a one-way clutch assembly 30, a torsionally resilient coupling 32, a seal cap 34, a hub 36, a drive member or pulley 38, a bearing 40, a thrust bushing 42, and a clutch bushing 44. The one-way clutch assembly 30 and the torsionally resilient coupling 32 are disposed in series in a torque path. The one-way clutch assembly 30 includes a lug 48 on the hub 36, a carrier 50, a retainer 52, a wrap spring 54, and a clutch housing 56. Briefly, the hub 36 is fixedly mounted to the crankshaft 22 (FIG. 1) of the engine 14. Rotation of the crankshaft 22 in a driven direction causes the lug 48 on the hub 36 to urge rotation of the wrap spring 54 in a direction that causes it to radially expand and act against an inner diameter of the clutch housing 56 causing the clutch housing 56 to rotate with the hub 36.

The torsionally resilient coupling 32 of FIG. 2 comprises a first spring flange 60 on the clutch housing 56, a torsion spring 66 and a spring support 68. In general, rotation of the clutch housing 56 in the driven direction acts on a first end of the torsion spring 66 and tends to cause corresponding rotation of the torsion spring 66. An opposite end of the torsion spring 66 acts on the spring support 68, which is coupled to the pulley 38. Resistance to the rotation of the pulley 38 created by the remainder of the front engine accessory drive 12 loads the torsion spring 66 so that the torsion spring 66 uncoils (expands in a radial direction).

In the particular example provided, the overrunning decoupler 10, being connected between the crankshaft 22 and the belt 24, functions as an input member to the front engine accessory drive 12, but it will be appreciated that the teachings of the present disclosure could be implemented somewhat differently. For example, an overrunning decoupler can be operatively disposed between the belt 24 and any one or more of the belt-driven accessories 16, 18 or 20 (i.e., coupled to the shaft of a given one of the belt-driven accessories 16, 18 or 20 and operable for transmitting rotary power from the belt 24 to the given one of the belt-driven accessories 16, 18 or 20). It will be appreciated that when the overrunning decoupler is associated with a given one of the belt-driven accessories 16, 18 or 20, the decoupler will automatically decouple the given one of the belt-driven accessories 16, 18 or 20 from the belt 24 when the belt 24 decelerates relative to the given one of the belt-driven accessories 16, 18 or 20 to permit the input shaft of the given one of the belt-driven accessories 16, 18 or 20 to overrun the pulley of the decoupler.

Figure 3:
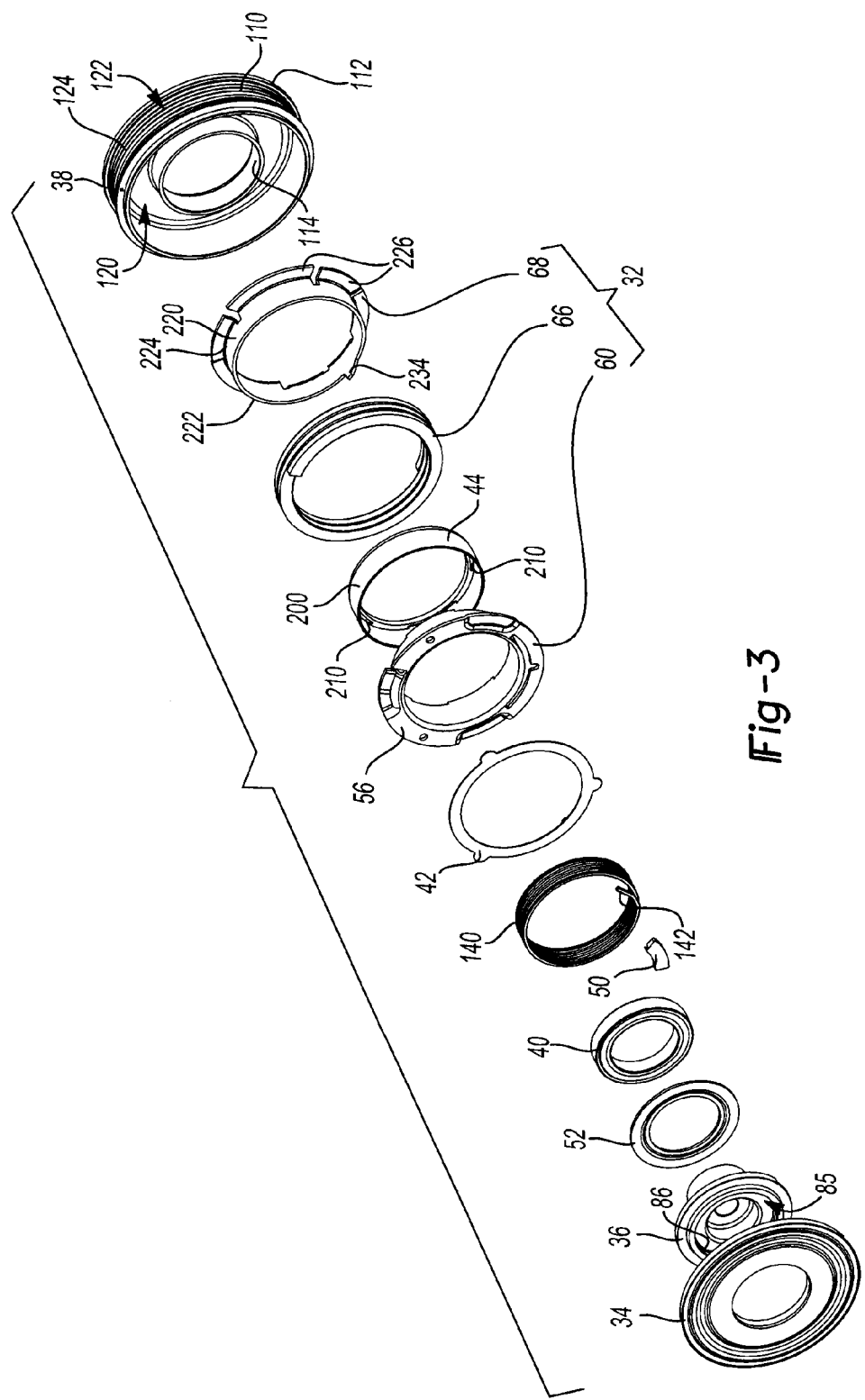
FIG. 3 is an exploded front perspective view of the overrunning decoupler of FIG. 1.
Figure 9:
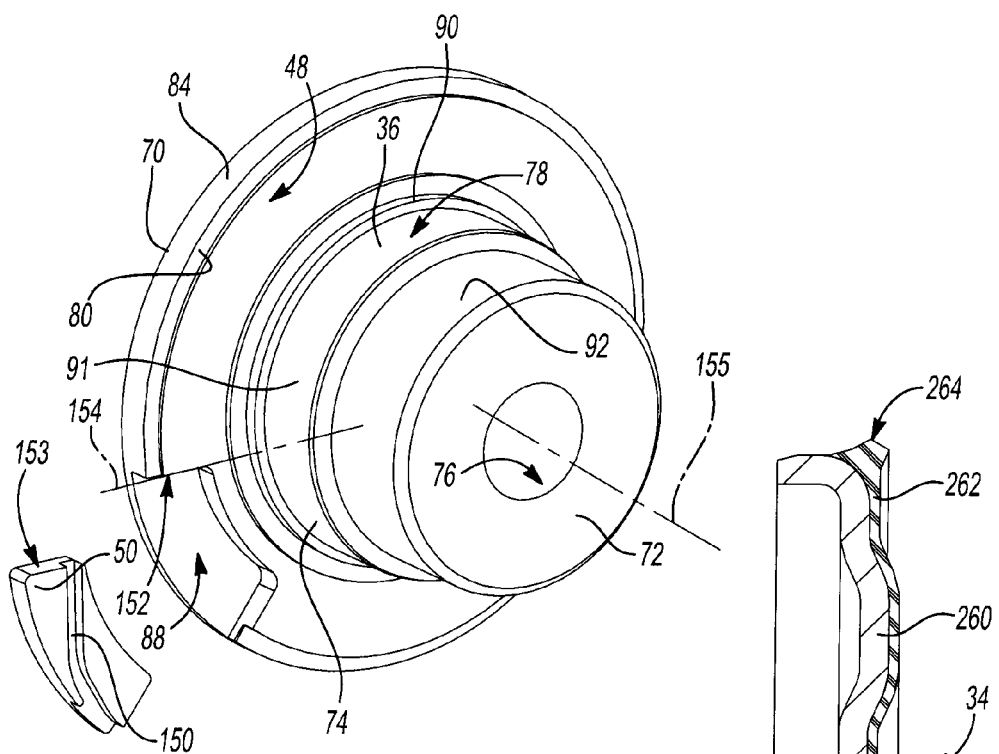
FIG. 9 is a rear perspective view of a hub of the overrunning decoupler of FIG. 1.
Figure 10:
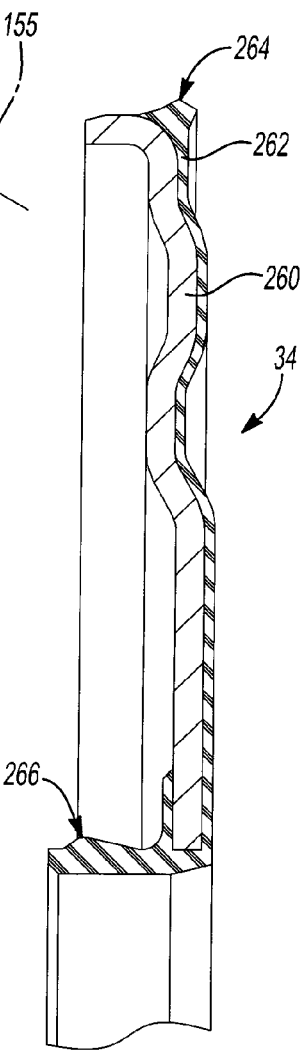
FIG. 10 is a partial longitudinal section view of a seal cap incorporated on the overrunning decoupler of FIG. 1.

With particular reference now to FIGS. 2, 3, and 9, the illustrated hub 36 will be described in greater detail. The hub 36 includes a first end 70, a second end 72, and a generally cylindrical body 74 extending axially therebetween. The cylindrical body 74 includes a bore 76 and an outer surface 78 that extends between the first end 70 and the second end 72. The bore 76 is sized for receiving a threaded fastener (not specifically shown) to fixedly secure the hub 36 to the crankshaft 22 (FIG. 1). An annular flange 80 extends radially outwardly from the cylindrical body 74 adjacent to the first end 70. The annular flange 80 has an outer flange surface 84 (FIG. 9) having a larger outer diameter than the outer surface 78. The annular flange 80 further includes a radial inset 85 (FIG. 3) and an inner cylindrical sidewall 86 on a side opposite to the lug 48. The lug 48 on the hub 36 further comprises a pocket 88 defined within the annular flange 80. The outer surface 78 of the cylindrical body 74 collectively comprises a proximal radial sidewall 90, an intermediate radial sidewall 91, and a distal radial sidewall 92.

Figure 4:
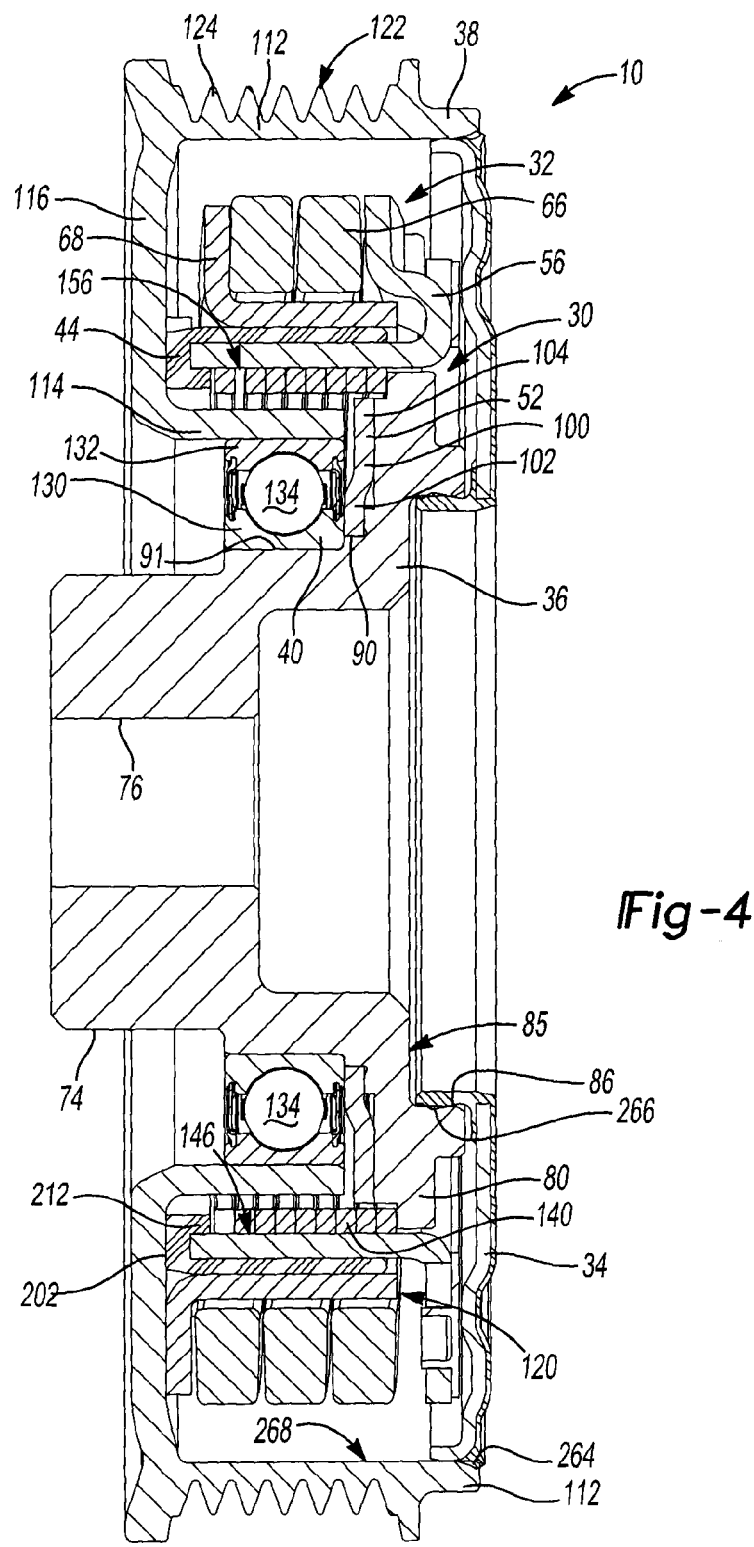
FIG. 4 is a longitudinal section view of the overrunning decoupler of FIG. 1.
Figure 5:
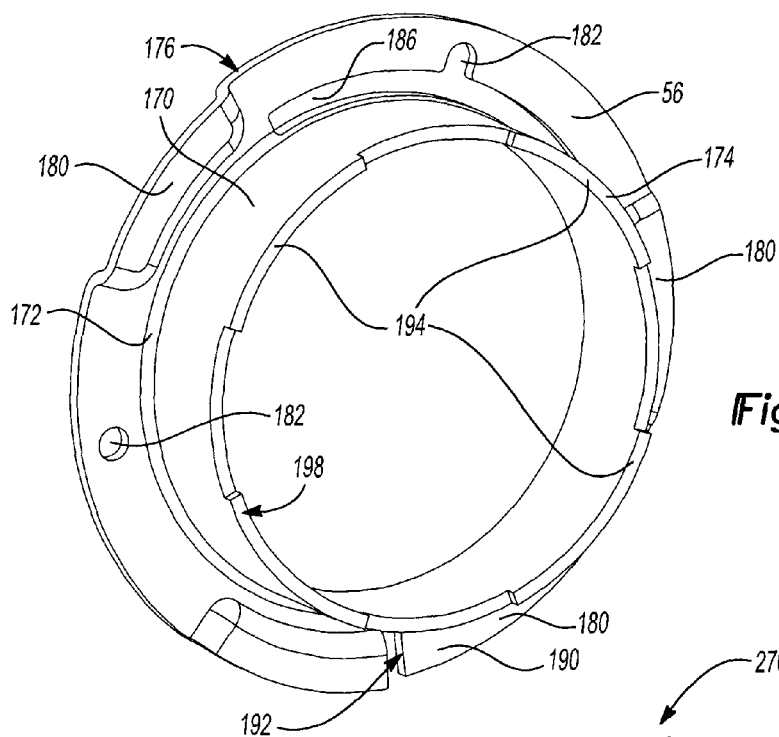
FIG. 5 is a rear perspective view of a clutch housing of the overrunning decoupler of FIG. 1.

With specific reference now to FIGS. 2-4, the illustrated retainer 52 generally comprises a retainer body 100 having a distal body portion 102 (FIG. 4) and a proximal body potion 104. The distal and proximal body portions 102 and 104 are axially offset relative to each other. In one example, the retainer 52 is press fit onto the cylindrical body 74 of the hub 36 at a location adjacent to the bearing 40. More specifically, an inner diameter of the retainer 52 (FIG. 4) is press fit onto the proximal radial sidewall 90 of the outer surface 78 provided on the cylindrical body 74 of the hub 36. The retainer 52 can further be abutted against the carrier 50 to maintain the carrier 50 within the pocket 88.

The pulley 38 is fixedly coupled to the spring support 68 such as by welding. The pulley 38 is also rotatably journaled to the hub 36. The pulley 38 generally includes a pulley body 110 that includes an outer cylindrical sidewall 112, an inner cylindrical sidewall 114, and an annular connecting face 116. In the illustrated example, the outer and inner cylindrical sidewalls 112 and 114 are concentric. The outer cylindrical sidewall 112, inner cylindrical sidewall 114, and connecting face 116 collectively define an annular channel 120 (FIG. 3). The outer cylindrical sidewall 112 includes an outer periphery 122 which can have a plurality of grooves 124 that are generally V-shaped and configured for engaging and guiding the belt 24.

The bearing 40 is press fit and coupled between the pulley 38 and the hub 36. The bearing 40 includes an inner race 130, an outer race 132 and a plurality of ball bearings 134. The inner race 130 (FIG. 4) is fixedly secured to the intermediate radial sidewall 91 of the cylindrical body 74 of the hub 36. The outer race 132 is secured to the inner cylindrical sidewall 114 of the body 110 of the pulley 38. The plurality of ball bearings 134 is seated for rotation between the inner race 130 and outer race 132 of the bearing 40.

Figure 8:
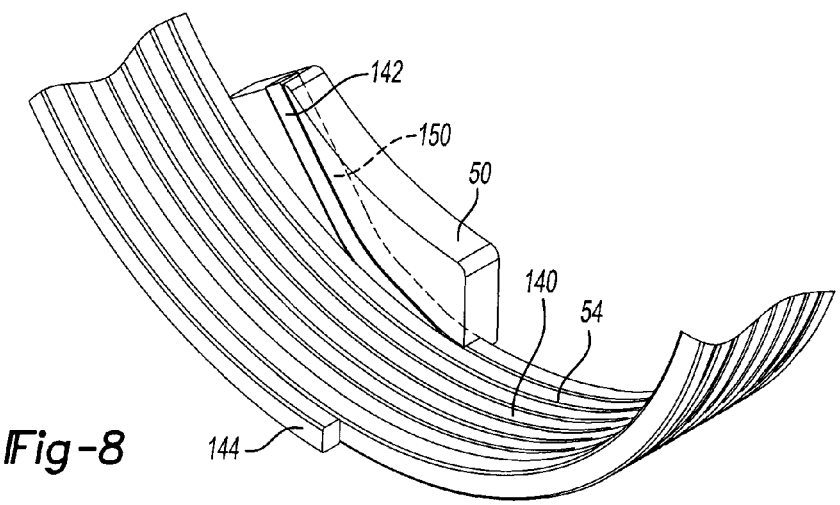
FIG. 8 is a partial rear perspective view of a wrap spring and carrier of the overrunning decoupler of FIG. 1.

The wrap spring 54 includes a plurality of helical coils 140 that extend between an engagement or first end 142 (FIG. 3) and an opposite second end 144 (FIG. 2). The wrap spring 54 may be formed from an uncoated, spring steel wire and has a non-circular cross-section, such as a square or rectangular cross-section, that is in frictional contact with a clutch surface 146 (FIG. 4) on the clutch housing. In the specific example shown, the cross-section of the wrap spring 54 is rectangular or square. A lubricant is employed on the interface between the wrap spring 54 and the clutch surface 146 to minimize wear between the wrap spring 54 and the clutch surface 146 of the clutch housing 56. The first end 142 of the wrap spring 54 is installed in a wrap spring groove 150 defined in the carrier 50 (see also FIGS. 8 and 9). The carrier 50 is preferably formed of plastic and is nestingly received into the pocket 88 of the hub 36 such that an axial end face E (FIG. 3) of the wire that forms the first end (e.g., engagement end) 142 (FIG. 3) abuts against the leading edge or end wall of the pocket 88 in the lug 48. When the hub 36 is rotated in the driven direction (counter-clockwise as viewed in FIG. 9), an edge or end wall 152 of the pocket 88 of the hub 36 acts against an opposing sidewall 153 of the carrier 50 as well as the axial end face of the first end 142 of the wrap spring 54 to transfer rotary power from the hub 36 to the wrap spring 54. The end wall 152 (FIG. 9) extends along a first radially extending axis 154. In the illustrated embodiment, the first radially extending axis 154 intersects a rotational axis 155 of the hub 36. The helical coils 140 near the second end 144 feature an axial gap 156 (FIG. 4). The axial gap 156 can help minimize the slope of the helical coils 140 near the second end 144. In this regard, the axial gap 156 is sized such that contact between the last one of the helical coils 140 and the clutch bushing 44 is disposed on a plane that is perpendicular to the rotational axis 155 of the hub 36. Explained further, line contact between the clutch bushing 44 and an edge of the axial end face of the helical coils 140 that forms the second end 144 is avoided.

The thrust bushing 42 (FIG. 2) has a ring-shaped body 158 having a plurality of locating nubs 160 protruding therefrom. The ring-shaped body 158 of the thrust bushing 42 further includes a stop or bumper tab 162 protruding therefrom. The thrust bushing 42 may be formed of a plastic material. The thrust bushing 42 generally provides a barrier between the seal cap 34 and the clutch housing 56. Additionally, as will be described in greater detail herein, the bumper tab 162 of the thrust bushing 42 can provide physical and audible dampening between the clutch housing 56 and the spring support 68 when the torsion spring 66 moves from a loaded condition to an unloaded condition.

With particular reference now to FIGS. 2-6, the clutch housing 56 will be described in greater detail. The clutch housing 56 generally includes a cylindrical sidewall 170 (FIG. 5) that extends between a first end 172 and a second end 174. An outer rim 176 radially extends outwardly from the first end 172 of the cylindrical sidewall 170. The outer rim 176 includes a plurality of inset portions 180 formed therearound. The inset portions 180 collectively define a first spring support surface 181 (FIG. 2). In the example provided, the plurality of insets 180 are arranged at progressive elevations to provide the first spring support surface 181 that coincides for alignment with the ramped end profile of the torsion spring 66. A plurality of apertures 182 are formed into the outer rim 176 for nestingly receiving the locating nubs 160 extending from the thrust bushing 42. The thrust bushing 42 is therefore coupled to rotate in unison with the clutch housing 56. An arcuate slot 186 (FIG. 5) is defined through the clutch housing 56 in a location generally transitioning between the cylindrical sidewall 170 and the outer rim 176. A flange 190 is formed at a disconnect located on one of the insets 180. The flange 190 can provide a first spring tab or engaging surface 192. The clutch housing 56 can be formed of sheet metal. The disconnect that provides the first engaging surface 192 is formed by a slit and deformation created in the flange 190. The second end 174 of the cylindrical sidewall 170 generally includes a plurality of radial projections 194 that collectively provide a castled end surface 198.

With particular reference to FIGS. 2-4, the clutch bushing 44 generally includes a cylindrical body 200 that extends between a first end 202 and a second end 204. The body 200 further comprises an inner cylindrical surface 206 (FIG. 2) and an outer cylindrical surface 208. The cylindrical body 200 further defines a plurality of pockets 210 formed into an inwardly extending radial sidewall 212 near the second end 204 (FIG. 3). The pockets 210 are configured to nestingly receive the radial projections 194 extending from the cylindrical sidewall 170 of the clutch housing 56. In this regard, once assembled, the clutch bushing 44 is non-rotatably coupled to the clutch housing 56. As best illustrated in FIG. 4, the second end 204 of the cylindrical body 200 of the clutch bushing 44 is received into the annular channel 120 and engages the pulley 38. Notably, the radial sidewall 212 engages the second end 144 of the wrap spring 54 to limit axial movement of the wrap spring 54. In the example provided, the clutch bushing 44 is formed of plastic.

The spring support 68 generally includes a cylindrical sidewall 220 that extends between a first end 222 and a second end 224 (FIGS. 2 and 3). A plurality of radially outwardly extending flanges 226 are arranged around the second end 224 of the cylindrical body 200. In the illustrated example, the flanges 226 extend at various elevations to support the ramped end profile of the torsion spring 66. Explained further, the flanges 226 collectively define a second spring support surface 230 (FIG. 2) that varies in elevation to axially support the torsion spring 66. A second spring tab or engaging surface 232 is provided on one of the flanges 226 for engaging a terminal end of the torsion spring 66 as will be described. A leg 234 extends from the first end 222 of the cylindrical body 200 of the spring support 68.

The torsion spring 66 extends generally between the clutch housing 56 and the spring support 68. In this regard, the torsion spring 66 is axially supported between the first spring support surface 181 on the clutch housing 56 and the second spring support surface 230 on the spring support 68. The torsion spring 66 is configured to transfer torque between the clutch housing 56 and the spring support 68. Specifically, first end 250 of the torsion spring 66 engages the first spring engaging surface 192 on the clutch housing 56 while a second end 252 of the torsion spring 66 engages the second spring engaging surface 232 on the spring support 68. In this regard, when the clutch housing 56 is rotated in the driven direction (counter-clockwise as viewed in FIG. 2), the first spring engaging surface 192 will act against the first end 250 of the torsion spring 66 and cause the torsion spring 66 to radially expand. Concurrently, the second end 252 of the torsion spring 66 imparts rotational motion onto the second spring engaging surface 232 of the spring support 68. As the spring support 68 is fixedly coupled to the pulley 38, the pulley 38 in turn is caused to rotate. The torsion spring 66 can also allow relative movement between the clutch housing 56 and the spring support 68 to accommodate changes in the speed of the pulley 38 due to generally oscillating changes in the operating speed of the engine 14. In the example shown, the torsion spring 66 and the wrap spring 54 are coiled in the same direction.

With specific reference now to FIGS. 2-4 and 10, the seal cap 34 will be described in greater detail. The seal cap 34 generally comprises a metal stamping 260 having an overmolded rubber portion 262. An outboard lip 264 and an inboard lip 266 are formed around the overmolded rubber portion 262. As best illustrated in FIG. 4, the outboard lip 264 is configured to sealingly engage an inner diameter 268 of the outer cylindrical sidewall 112. The inboard lip 266 is configured to sealingly engage the inner cylindrical sidewall 86 formed on the annular flange 80 of the hub 36. In general, the seal cap 34 can inhibit grease from escaping the one-way clutch assembly 30 while inhibiting dirt and contaminants from entering the one-way clutch assembly 30. Notably, centrifugal force will tend to urge the inboard lip 266 of the seal cap 34 into engagement with the inner cylindrical sidewall 86 of the hub 36. Such a configuration is particularly advantageous as it tends to eliminate the need of a supplemental support (metal ring etc.) to maintain a sealing force onto the inner cylindrical sidewall 86 of the hub 36.

Figure 6:
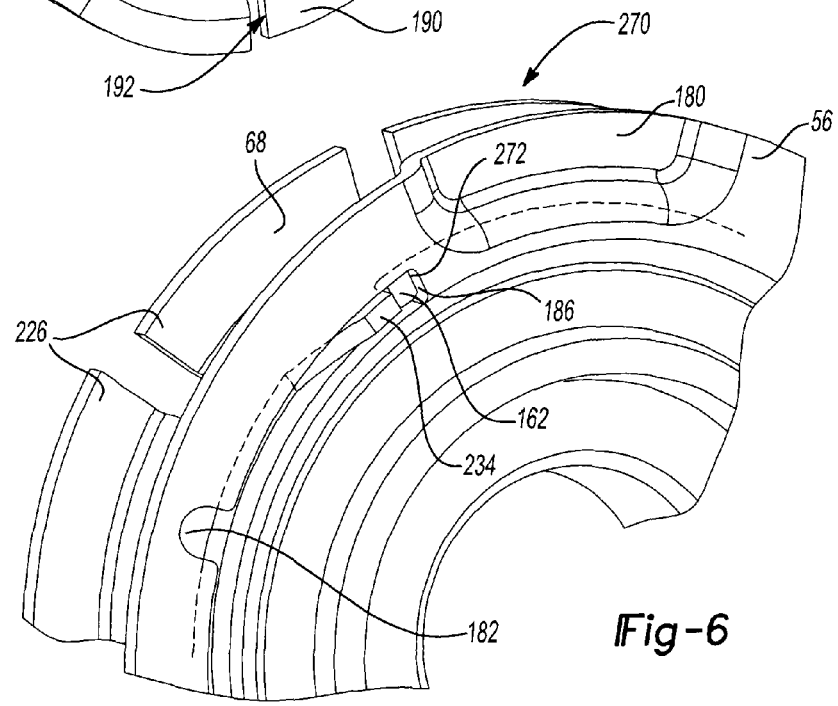
FIG. 6 is a partial rear perspective view of an anti-ramp-up feature that cooperates with the clutch housing and a spring support of the overrunning decoupler of FIG. 1.
Figure 7:
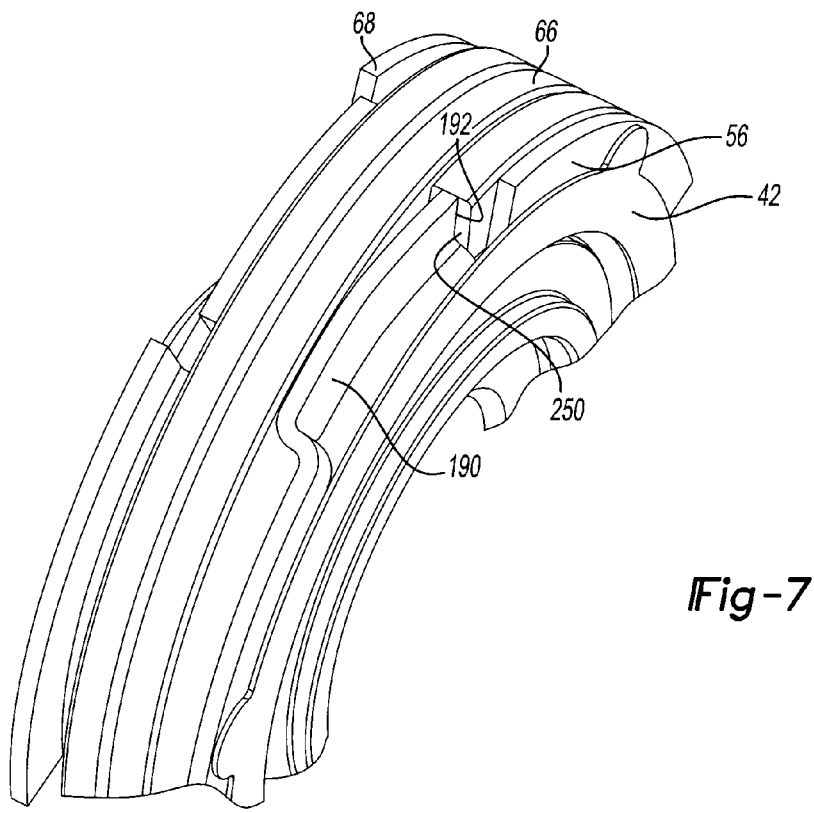
FIG. 7 is a partial front perspective view of the overrunning decoupler of FIG. 1 illustrating a torsion spring engaged to a first spring engaging surface of the clutch housing.

With particular reference now to FIG. 6, additional features of the overrunning decoupler 10 will be described in greater detail. The overrunning decoupler 10 can further comprise an anti-ramp-up device 270. The anti-ramp-up device 270 can inhibit ramp-up or relative movement of the torsion spring 66 and the clutch housing 56 such as when the torsion spring 66 goes from a loaded condition (driven) to an unloaded condition (such as an overrunning condition). Specifically, the anti-ramp-up device 270 can include the leg 234 of the spring support 68, the bumper tab 162 of the thrust bushing 42, and the arcuate slot 186 defined in the clutch housing 56. During relative rotation of the clutch housing 56 and the spring support 68, the leg 234 is caused to rotate along the arcuate slot 186 to accommodate changes in the speed of the pulley 38. The leg 234 can travel between opposing sides of the arcuate slot 186. The anti-ramp-up position is shown in FIG. 6 and is defined as a position in which the leg 234 engages the bumper tab 162 which in turn engages a terminal end 272 of the arcuate slot 186. In this regard, when the torsion spring 66 goes from a loaded condition to an unloaded condition, the torsion spring 66 can generally contract to a relaxed position. Concurrently, the spring support 68 is caused to rotate in a direction generally clockwise shown in FIG. 6 relative to the clutch housing 56. The leg 234 is caused to slidably negotiate along the arcuate slot 186 until which point the leg 234 urges the bumper tab 162 into the terminal end 272 of the arcuate slot 186. Notably, because the bumper tab 162 of the thrust bushing 42 is made of plastic, a physical and audible dampening is provided during impact. Moreover, metal on metal contact between the leg 234 and the clutch housing 56.

With general reference now to FIGS. 1-9, a rotary power transfer path of the overrunning decoupler 10 in a driven condition will be described. At the outset, rotation of the crankshaft 22 in a driven direction will in turn cause the hub 36 that is fixedly mounted to the crankshaft 22 to rotate in a direction generally counter-clockwise as viewed in FIG. 2. Rotation of the hub 36 urges the first end 142 of the wrap spring 54 (received in the pocket 88 of the hub 36) to rotate. The wrap spring 54 can then be caused to radially expand (uncoil) due to rotational resistance to turning the pulley 38 stemming from a remainder of the accessory drive (FIG. 1). The wrap spring 54 acts against the clutch surface 146 of the clutch housing 56 causing the clutch housing 56 to rotate with the hub 36. Rotation of the clutch housing 56 causes the first spring engaging surface 192 of the clutch housing 56 to drive the first end 250 of the torsion spring 66. The torsion spring 66 radially expands and causes the second end 252 of the torsion spring 66 to act on the second spring engaging surface 232 of the spring support 68. The spring support 68 is then caused to rotate with the pulley 38 which is fixedly coupled to the spring support 68.

In an overrunning condition, the crankshaft 22 rotates at a slower speed than the pulley 38. Such a condition is caused by the engine 14 decelerating. With the pulley 38 rotating faster than the hub 36, the torsion spring 66 and the wrap spring 54 can move to an unloaded position or contract. Specifically, when the wrap spring 54 contracts, the engagement of the wrap spring 54 with the clutch surface 146 on the clutch housing 56 is relieved permitting relative rotation of the clutch housing 56 and the hub 36. Explained further, deceleration of the hub 36 relative to the pulley 38 unloads the torsion spring 66 so that the wrap spring 54 can coil more tightly and disengage to a degree from the clutch surface 146. This permits the helical coils 140 of the wrap spring 54 to slide on the clutch surface 146 so that the pulley 38 can overrun the hub 36.

Figure 11:
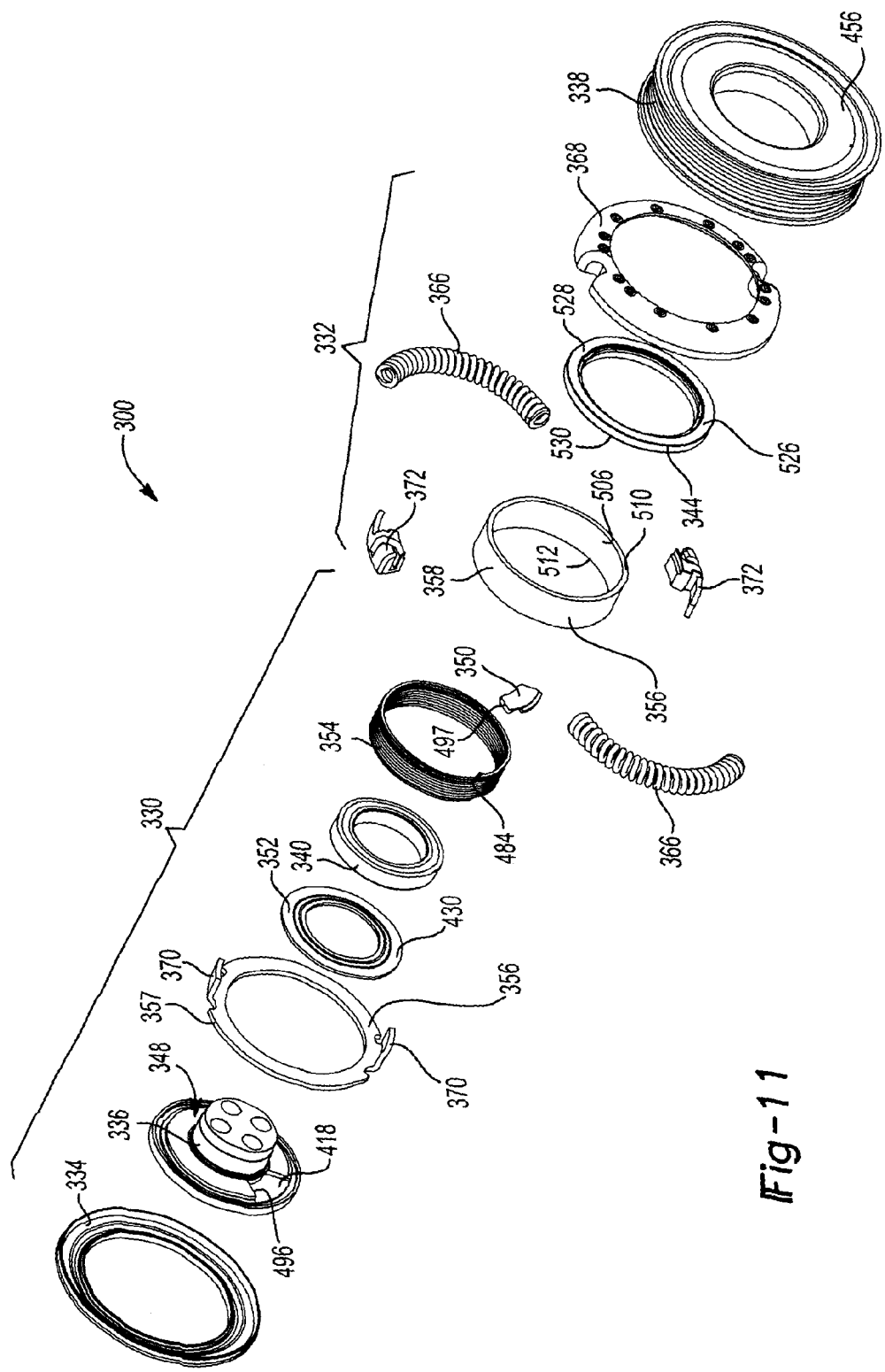
FIG. 11 is an exploded rear perspective view of a second exemplary overrunning decoupler constructed in accordance with additional features of the present disclosure.
Figure 12:
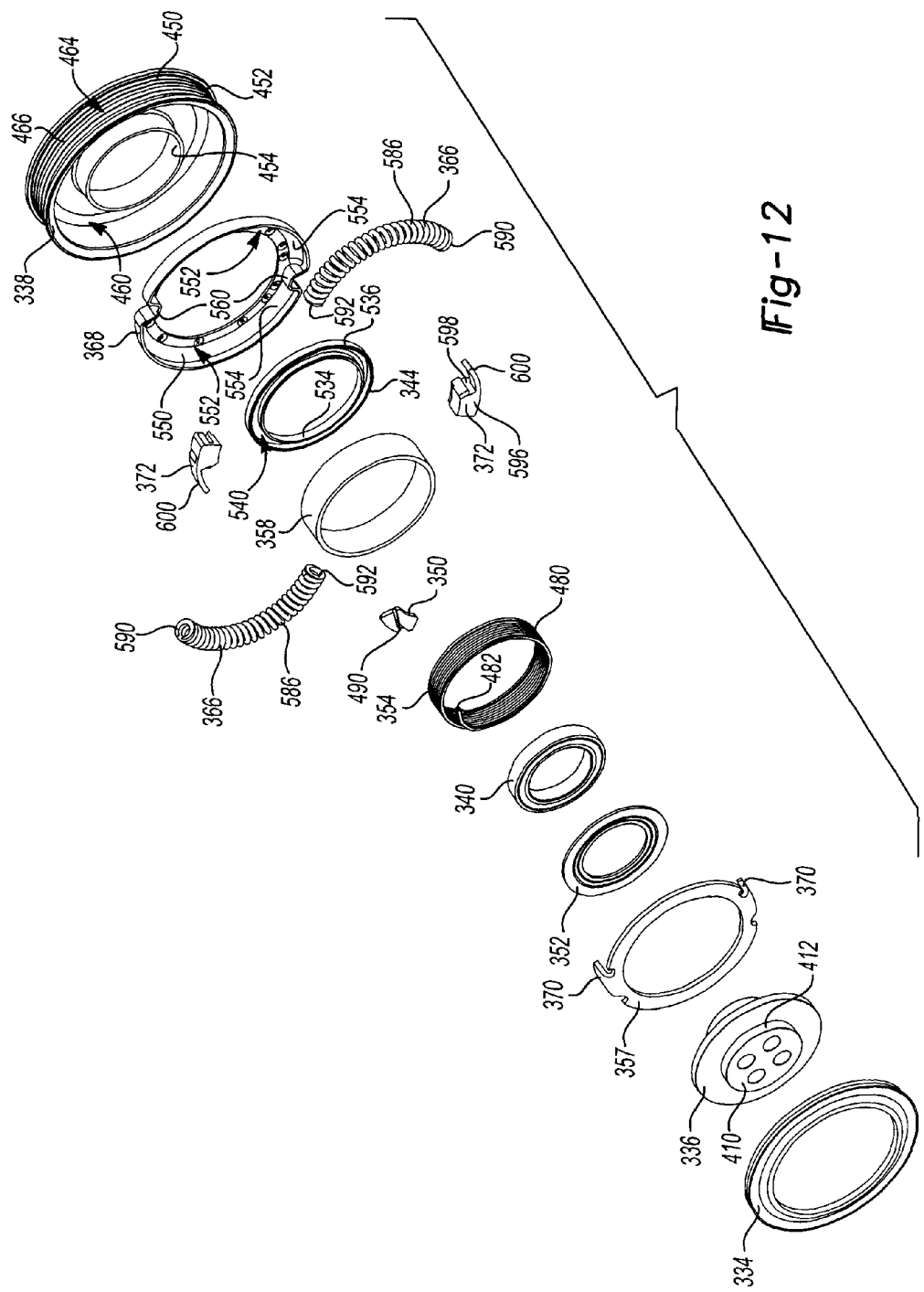
FIG. 12 is an exploded front perspective view of the overrunning decoupler of FIG. 11.

With reference now to FIGS. 11-12, a second overrunning decoupler constructed in accordance with additional teachings of the present disclosure is generally indicated by reference numeral 300. The overrunning decoupler 300 generally comprises a one-way clutch assembly 330, a torsionally resilient coupling 332, a seal cap 334, a hub 336, a pulley 338, a ball bearing assembly 340 and a bushing 344. The one-way clutch assembly 330 and the torsionally resilient coupling 332 are disposed in series in a torque path. The one-way clutch assembly 330 generally comprises a lug 348 on the hub 336, a carrier 350, a retainer 352, a wrap spring 354 and a clutch housing 356. In the example shown, the clutch housing 356 collectively includes a clutch ring 357 and a clutch sleeve 358. Briefly, the hub 336 is fixedly mounted to the crankshaft 22 (FIG. 1) of the engine 14. Rotation of the crankshaft 22 in a driven direction causes the lug 348 on the hub 336 to urge rotation of the wrap spring 354 in a direction that causes it to radially expand and act against an inner diameter of the clutch sleeve 358 of the clutch housing 356 causing the clutch housing 356 to rotate with the hub 336.

The torsionally resilient coupling 332 generally comprises a pair of arcuate springs 366, a spring support 368, a pair of tabs 370 and a pair of stops or bumpers 372. While the configuration shown and described includes one pair of arcuate springs 366, tabs 370, and bumpers 372, other combinations may be similarly employed.

In general, when the clutch housing 356 rotates in the driven direction, the tabs 370 act on respective first ends of the arcuate springs 366 causing the arcuate springs 366 to compress. Resistance to the rotation of the pulley 338 created by the remainder of the front engine accessory drive 12 (FIG. 1) loads the arcuate springs 366 so that the arcuate springs 366 compress. An opposite end of the respective arcuate springs 366 acts on opposing spring engaging surfaces provided on the spring support 368 causing the spring support 368 and the pulley 338, which is fixedly coupled to the spring support 368, to rotate with the clutch housing 356.

In the particular example provided, the overrunning decoupler 300 functions as an input member to the front engine accessory drive 12, but it will be appreciated that the teachings of the present disclosure could be implemented somewhat differently. For example, an overrunning decoupler can be operatively disposed between the belt 24 and any one or more of the belt-driven accessories 16, 18 or 20 (i.e., coupled to the shaft of a given one of the belt-driven accessories 16, 18 or 20 and operable for transmitting rotary power from the belt 24 to the given one of the belt-driven accessories 16, 18 or 20). It will be appreciated that when the overrunning decoupler is associated with a given one of the belt-driven accessories 16, 18 or 20, the decoupler will automatically decouple the given one of the belt-driven accessories 16, 18 or 20 from the belt 24 when the belt 24 decelerates relative to the given one of the belt-driven accessories 16, 18 or 20 to permit the input shaft of the given one of the belt-driven accessories 16, 18 or 20 to overrun the pulley of the decoupler.

Figure 18:
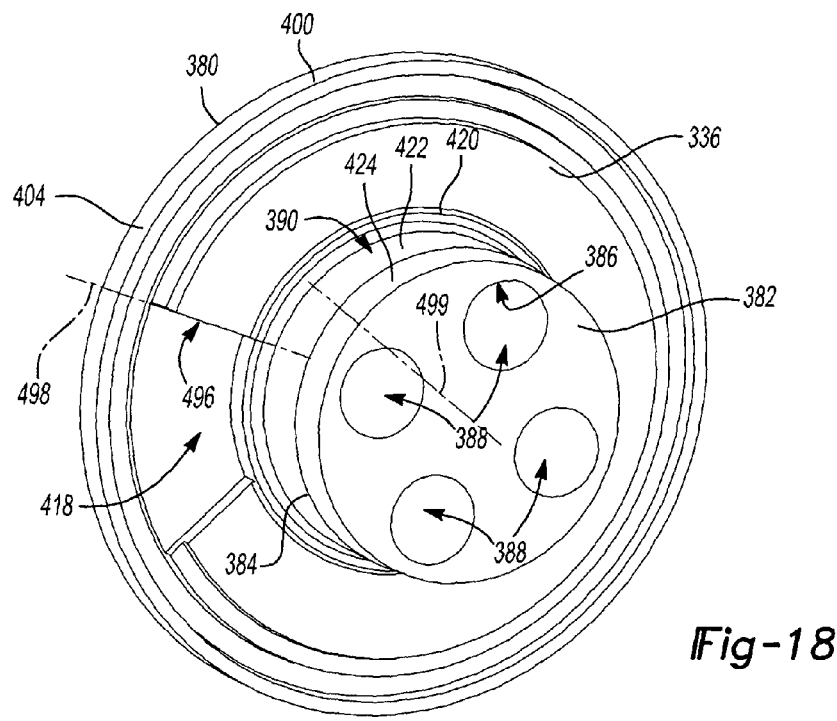
FIG. 18 is a rear perspective view of a hub of the overrunning decoupler of FIG. 11.

With particular reference now to FIGS. 11, 12, and 18, the hub 336 will be described in greater detail. The hub 336 generally includes a first end 380 (FIG. 18), a second end 382, and a generally cylindrical body 384 extending axially therebetween. The cylindrical body 384 includes an inner surface 386 collectively defined by a plurality of fastener receiving holes 388. The cylindrical body 384 further comprises an outer surface 390 that extends between the first end 380 and the second end 382. The fastener receiving holes 388 are sized for receiving threaded fasteners to fixedly secure the hub 336 to the crankshaft 22 (FIG. 1). An annular flange 400 extends radially outwardly from the cylindrical body 384 adjacent to the first end 380. The annular flange 400 has an outer flange surface 404 (FIG. 18) having a larger outer diameter than the outer surface 390. The annular flange 400 further includes a radial outset 410 (FIG. 12) that provides an outer cylindrical sidewall 412. The lug 348 on the hub 336 further includes a pocket 418 defined into the annular flange 400. The outer surface 390 of the cylindrical body 384 collectively includes a proximal radial sidewall 420, an intermediate radial sidewall 422, and a distal radial sidewall 424.

Figure 13:
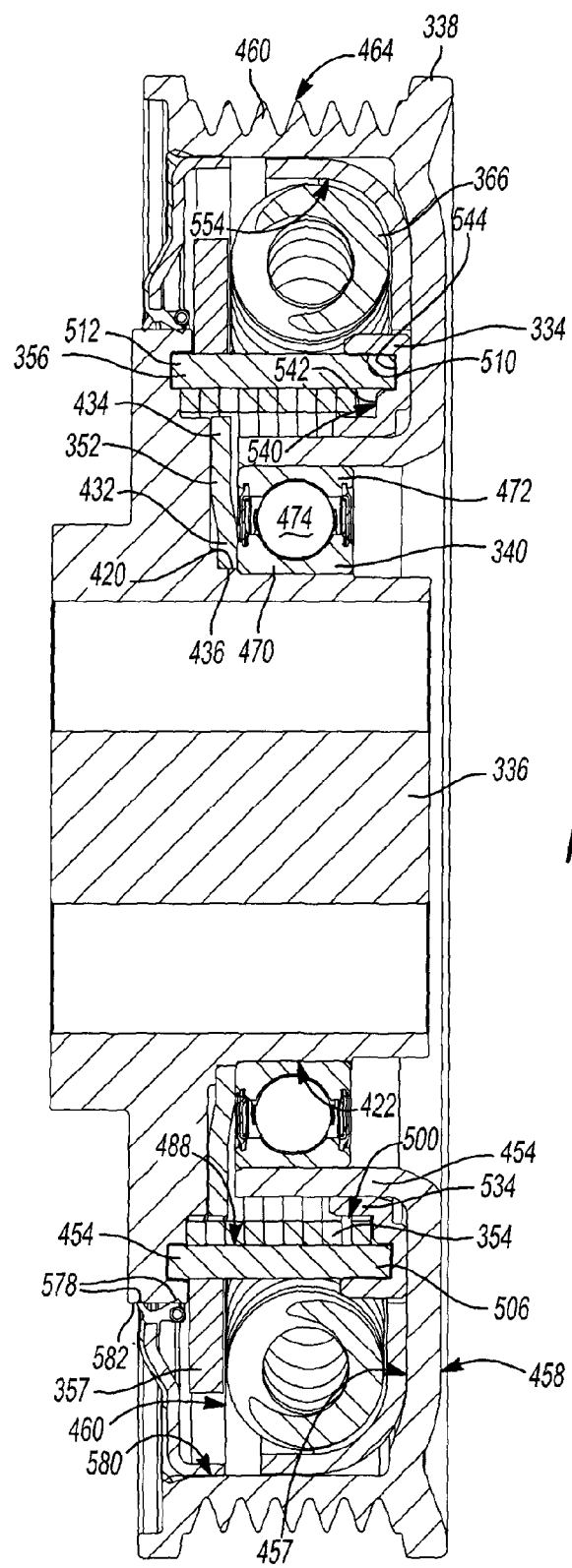
FIG. 13 is a longitudinal section view of the overrunning decoupler of FIG. 11.
Figure 14:
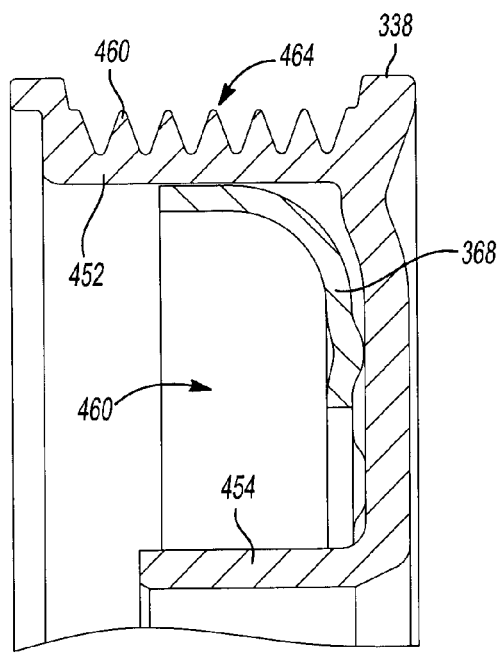
FIG. 14 is a partial longitudinal section view of a pulley and spring support of the overrunning decoupler of FIG. 11.

With reference now to FIGS. 11-13, the retainer 352 generally includes a retainer body 430 having a distal body portion 432 and a proximal body portion 434. The distal and proximal body portions 432 and 434 are axially offset relative to each other. In one example, the retainer 352 is press-fit onto the cylindrical body 384 of the hub 336 at a location adjacent to the ball bearing assembly 340 (FIG. 13). More specifically, an inner diameter of the retainer 352 is press-fit onto the proximal radial sidewall 420 of the outer surface 390 provided on the cylindrical body 384 of the hub 336.

The pulley 338 is fixedly coupled to the spring support 368 such as by welding. The pulley 338 is rotatably journaled to the hub 336. The pulley 338 generally includes a pulley body 450 that includes an outer cylindrical sidewall 452, an inner cylindrical sidewall 454, and an annular connecting face 456 (FIG. 11). In the illustrated example, the outer and inner cylindrical sidewalls 452 and 454 are concentric. The outer cylindrical sidewall 452, the inner cylindrical sidewall 454, and the connecting face 456 collectively define an annular channel 460 (FIG. 12). The connecting face 456 further includes an inner face 457 and an outer face 458 (FIG. 13). The outer cylindrical sidewall 452 can include an outer periphery 464 having a plurality of grooves 466 that are generally V-shaped and configured for engaging and guiding the belt 24.

The ball bearing assembly 340 is press-fit and coupled between the pulley 338 and the hub 336. The ball bearing assembly 340 includes an inner race 470 (FIG. 13), an outer race 472 and a plurality of ball bearings 474. The inner race 470 is fixedly secured to the intermediate radial sidewall 422 of the cylindrical body 384 of the hub 336. The outer race 472 is secured to the inner cylindrical sidewall 454 of the body 450 of the pulley 338. The plurality of ball bearings 474 are seated for rotation between the inner race 470 and the outer race 472 of the ball bearing assembly 340.

The wrap spring 354 generally includes a plurality of helical coils 480 (FIG. 12) that extend between an engagement or hooked first end 482 and an opposite second end 484. In one example, the wrap spring 354 is formed from an uncoated, spring steel wire and has a non-circular cross-section, such as a square or rectangular cross-section that is in frictional contact with a clutch surface 488 (FIG. 13) of the clutch sleeve 358 of the clutch housing 356. In the example shown, the cross-section of the wrap spring 354 is rectangular or square. A lubricant can be employed on the interface between the wrap spring 354 and the clutch surface 488 of the clutch sleeve 358 of the clutch housing 356 to minimize wear between the wrap spring 354 and the clutch housing 356. The first end 482 of the wrap spring 354 is fixedly received into a wrap spring groove 490 (FIG. 12) defined in the carrier 350. The carrier 350 can be formed of plastic and be nestingly received into the pocket 418 of the hub 336 such that an axial end face of the wire that forms the first end 482 (FIG. 12) abuts against the leading edge or end wall of the pocket 418 (i.e., the lug 348).

As with the configuration described above with respect to the hub 36, the hub 336 is rotated in the driven direction (counter-clockwise as viewed in FIG. 11). An end wall 496 (FIG. 18) of the pocket 418 of the hub 336 acts against an opposing sidewall 497 (FIG. 11) of the carrier 350 as well as the axial end face of the first end 482 of the wrap spring 354 to transfer rotary power from the hub 336 to the wrap spring 354. The end wall 496 (FIG. 18) extends along a first radially extending axis 498. In the illustrated configuration, the first radially extending axis 498 intersects a rotational axis 499 of the hub 336. The helical coils 480 near the second end 484 define an axial gap 500 (FIG. 13) that can help minimize the slope of the helical coils 480 near the second end 484. In this regard, the axial gap 500 is sized such that contact between the last one of the helical coils 480 and the bushing 344 is disposed on a plane that is perpendicular to the rotational axis 499 of the hub 336. Explained further, line contact between the bushing 344 and an edge of the axial end face of the helical coils 480 that forms the second end 484 is avoided.

With particular reference now to FIGS. 11-13, the clutch housing 356 will be described in greater detail. It will be appreciated that while the specific example shown provides a clutch housing 356 having a separately formed clutch ring 357 and clutch sleeve 358, that the clutch housing 356 may be a single unitary component. The clutch housing 356 generally includes a cylindrical sidewall 506 that extends between a first end 510 and a second end 512 (FIG. 13). The clutch ring 357 is fixedly secured to the clutch sleeve 358 and radially extends outwardly from the clutch sleeve 358 proximate to the second end 512. The tabs 370 extend from the clutch ring 357 at generally diametrically opposed locations. Other configurations are contemplated. The tabs 370 can further comprise a first compressing end 520 (FIG. 16) and an opposite end 522.

With particular reference now to FIGS. 11-13, the bushing 344 generally includes a cylindrical body 526 that extends between a first end 528 (FIG. 11) and a second end 530. The bushing 344 is configured to slidably negotiate around the inner face 457 of the pulley 338. The body 526 includes an inner cylindrical surface 534 (FIG. 12) and an outer cylindrical surface 536 so as to define an annular channel 540 therebetween. As viewed in FIG. 13, the channel 540 is further defined by an inwardly stepped channel 542 and an outwardly stepped channel 544. In general, the wrap spring 354 is aligned for receipt at the inner channel 542 while the sidewall 506 of the clutch sleeve 358 is aligned for receipt at the outer channel 544. Once assembled, the bushing 344 is non-rotatably coupled to the clutch housing 356. As shown in FIG. 13, the inner cylindrical sidewall 534 of the bushing 344 is received into the channel 460 of the pulley 338 and engages the pulley 338. Notably, an axial movement of the wrap spring 354 is inhibited by the bushing 344 at the inner channel 542.

Figure 15:
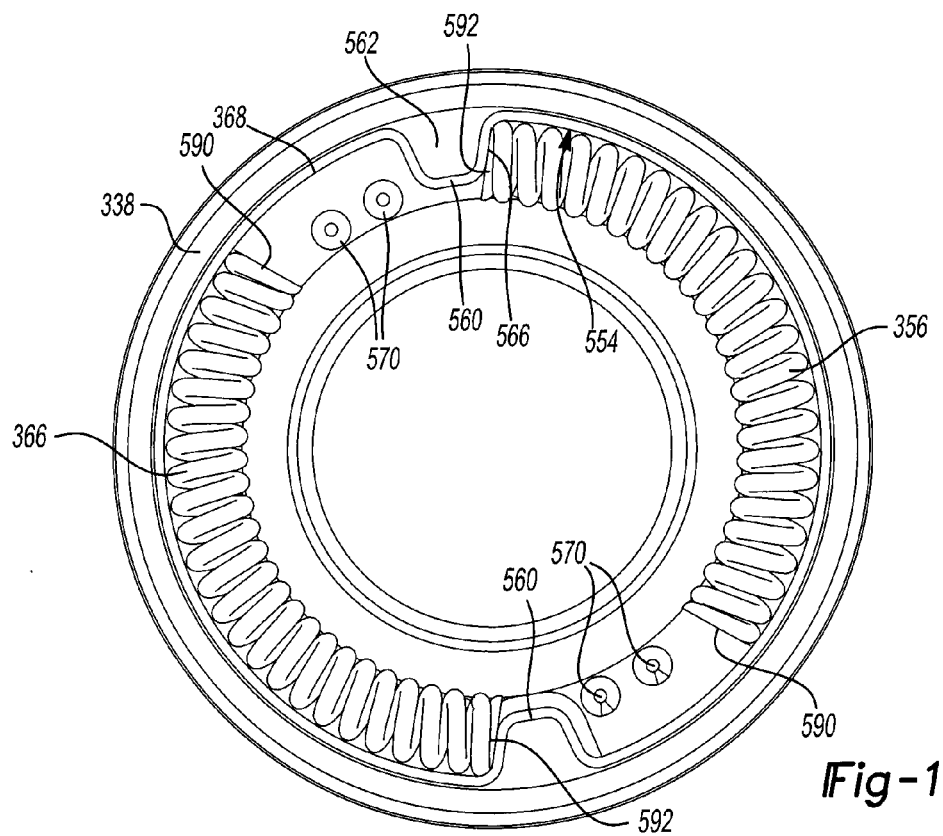
FIG. 15 is a front plan view of the spring support, pulley, and an arcuate spring of the overrunning decoupler of FIG. 11.

The spring support 368 (FIG. 12) includes a generally cylindrical body 550 that includes a pair of opposing annular receiving pockets 552. The body 550 further includes a corresponding pair of load bearing sidewalls 554. The body 550 of the spring support 368 includes a pair of insets 560. The insets 560 can both generally include a bumper receiving portion 562 (FIG. 15) and a spring engaging end 566. The second ends of the springs 366 are configured to bear against the spring engaging ends 566 of the insets 560. A plurality of dimples 570 are formed around the body 550 of the spring support 368 to facilitate welding of the spring support 368 to the pulley 338.

With particular reference now to FIGS. 11, 12, and 17, the seal cap 334 will be described in greater detail. The seal cap 334 generally includes a metal stamping 572, a metal annular ring 573 and an overmolded rubber portion 574. An outboard lip 576 and an inboard lip 578 are formed around the overmolded rubber portion 574. As best illustrated in FIG. 13, the outboard lip 576 is configured to sealingly engage an inner diameter 580 of the outer cylindrical sidewall 452 of the pulley 338. The inboard lip 578 is configured to sealingly engage an outer circumferential surface 582 formed around the hub 336. The annular ring 573 can assist in maintaining a radially inward sealing force against the outer circumferential surface 582 of the hub 336. In general, the seal cap 334 can inhibit grease from escaping the one-way clutch assembly 330 while inhibiting dirt and contaminants from entering the one-way clutch assembly 330.

Each arcuate spring 366 includes a plurality of helical coils 586 (FIG. 12) that extend between respective first and second ends 590 and 592. Each bumper 372 includes a bumper body 596 that defines a tab receiving slot 598 and a projection 600. The bumpers 372 can be formed of injection molded plastic. The tab receiving slot 598 is configured to extend a radial distance to accommodate receipt of a respective tab 370. Notably, the projections 600 can engage the first end 590 of the springs 366 to maintain the first ends 590 of the springs at a radially offset distance from the slot 598. In this regard, during assembly, the tabs 370 are easily advanced into respective slots 598 of the bumpers 372 without requiring additional manipulation of the springs 366. In use, the bumpers 372 can preclude physical and audible impact of the tabs 370 against the insets 560 on the spring support 368.

With general reference now to FIGS. 11-16, a rotary power transfer path of the overrunning decoupler 300 in a driven condition will be described. At the outset, rotation of the crankshaft 22 in a driven direction will cause the hub 336 to rotate in a direction generally counter-clockwise as viewed in FIG. 11. Rotation of the hub 336 urges the first end 482 of the wrap spring 354 (received in the pocket 418 of the hub 336) to rotate. The wrap spring 354 radially expands due to rotational resistance of the pulley 338 stemming from the inertia of the accessory drive (FIG. 1). The wrap spring 354 acts against the clutch surface 488 of the clutch sleeve 358 causing the clutch housing 356 to rotate with the hub 336. Rotation of the clutch housing 356 causes the tabs 370 on the clutch ring 367 to drive the first ends 590 of the respective arcuate springs 366 (in a compression direction generally counter-clockwise as viewed in FIGS. 15 and 16). The arcuate springs 366 are caused to initially compress and subsequently transmit a rotational force from the second ends 592 (FIG. 15) of the springs 366 onto the spring engaging end 566 provided on the insets 560 on the spring support 368. The spring support 368 is then caused to rotate with the pulley 338, which is fixedly coupled to the spring support 368.

In an overrunning condition, the crankshaft 22 rotates at a slower speed than the pulley 338. Such a condition is caused by the engine 14 decelerating. Explained further, deceleration of the hub 336 relative to the pulley 338 unloads the arcuate springs 366 so that the wrap spring 354 can coil more tightly and disengage to a degree from the clutch surface 488. This permits the helical coils 480 of the wrap spring 354 to slide on the clutch surface 488 so that the pulley 338 can overrun the hub 336. With the pulley 338 rotating faster than the hub 336, the arcuate springs can move to a generally uncompressed position while the wrap spring 354 contracts. In this regard, when the wrap spring 354 contracts, the engagement of the wrap spring 354 with the clutch surface 488 of the clutch sleeve 358 is relieved permitting relative rotation of the clutch housing 356 and the hub 336. Of note, when compression of the arcuate springs 366 is relieved, the tabs 370 are caused to rotate in a generally clockwise direction as viewed in FIG. 16 by the bias of the springs 366. The tabs 370 are guided into the respective slots 598 of the bumpers 372. As the bumpers 372 are preferably made of a plastic material, a dampening effect is provided and metal-on-metal contact between the tabs 370 and the inset 560 of the spring support 368 is avoided.

Figure 19:
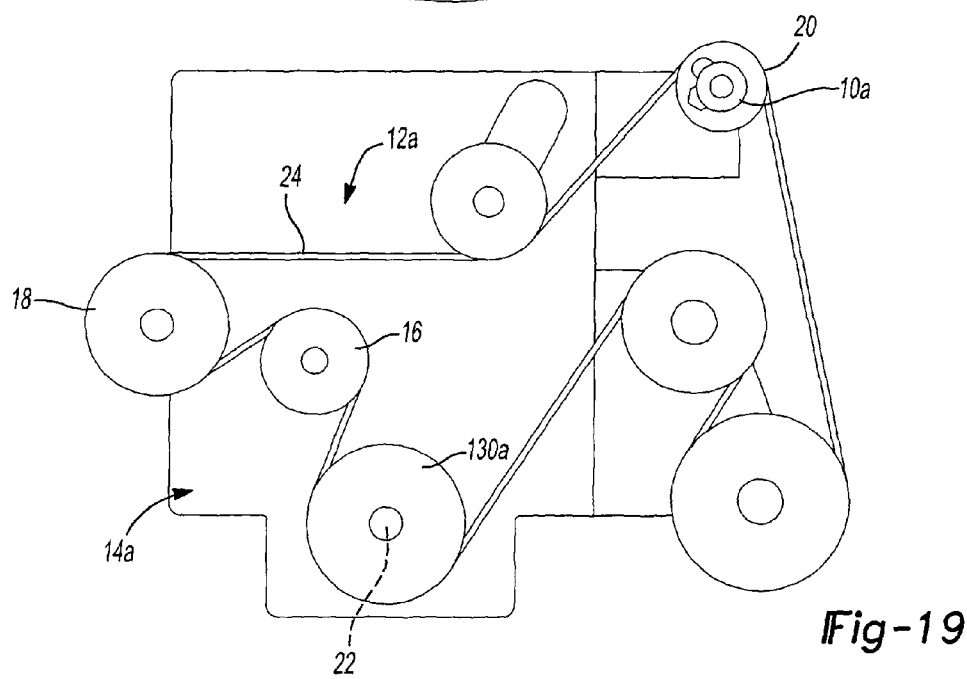
FIG. 19 is a schematic illustration of another exemplary overrunning decoupler configuration constructed in accordance with the teachings of the present disclosure and shown in operative association with an internal combustion engine.

With reference now to FIG. 19, another overrunning decoupler configuration constructed in accordance to additional teachings of the present disclosure is generally indicated at reference numeral 10a. The overrunning decoupler 10a is employed in a front engine accessory drive 12a of an internal combustion engine 14a. The front engine accessory drive 12a can include a plurality of engine accessories, such as a water pump 16, an air conditioning compressor 18, and a starter/generator or starter/alternator 20 that is driven by the crankshaft 22 of the engine 14a via a belt 24 and a crankshaft pulley 22a. By way of example, the overrunning decoupler 10a is configured to include either of the overrunning decoupler 10 or 300 described above.

Figure 20:
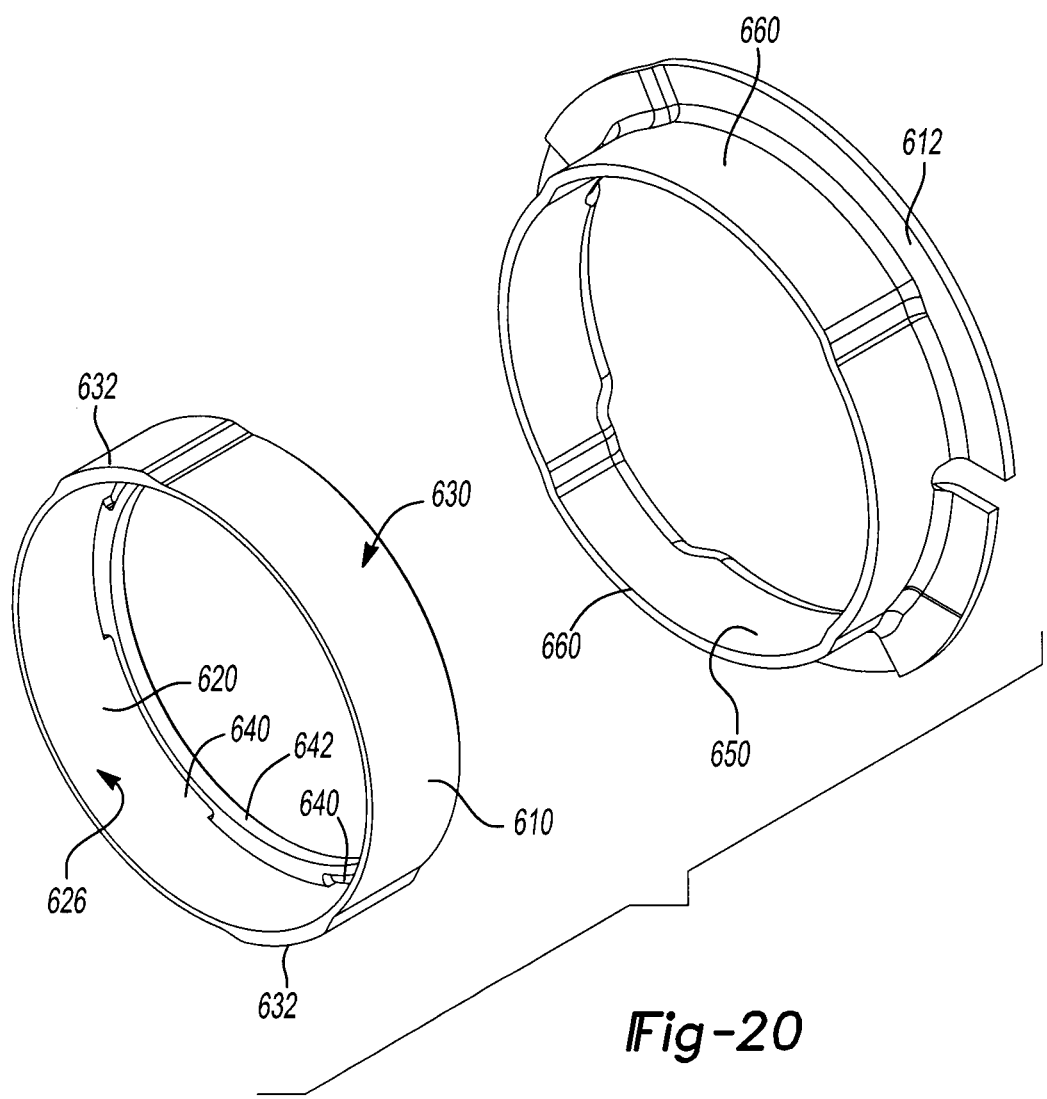
FIG. 20 is an exploded perspective view of an exemplary bushing and spring support constructed in accordance to additional features of the present disclosure.
Figure 22:
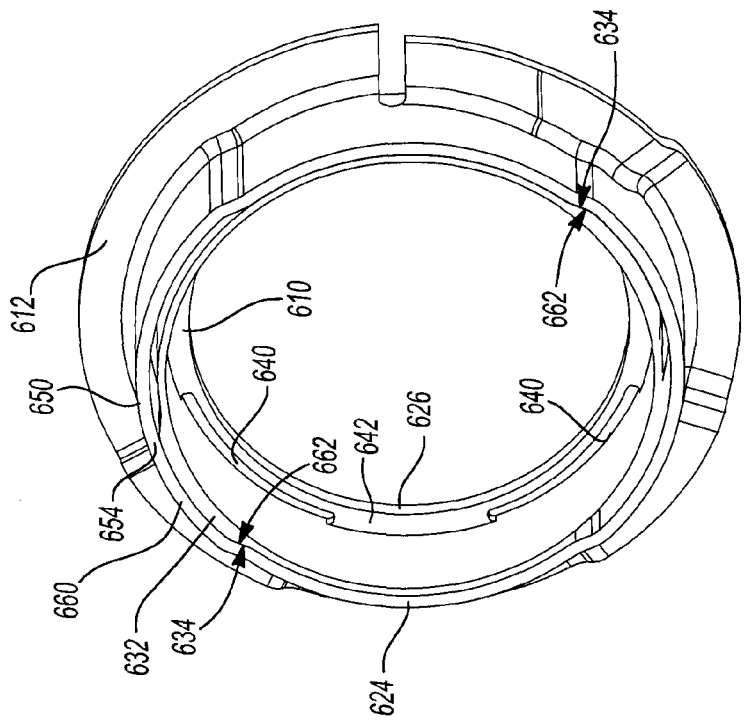
FIG. 22 is a rear perspective view of the bushing and spring support shown in FIG. 21.
Figure 21:
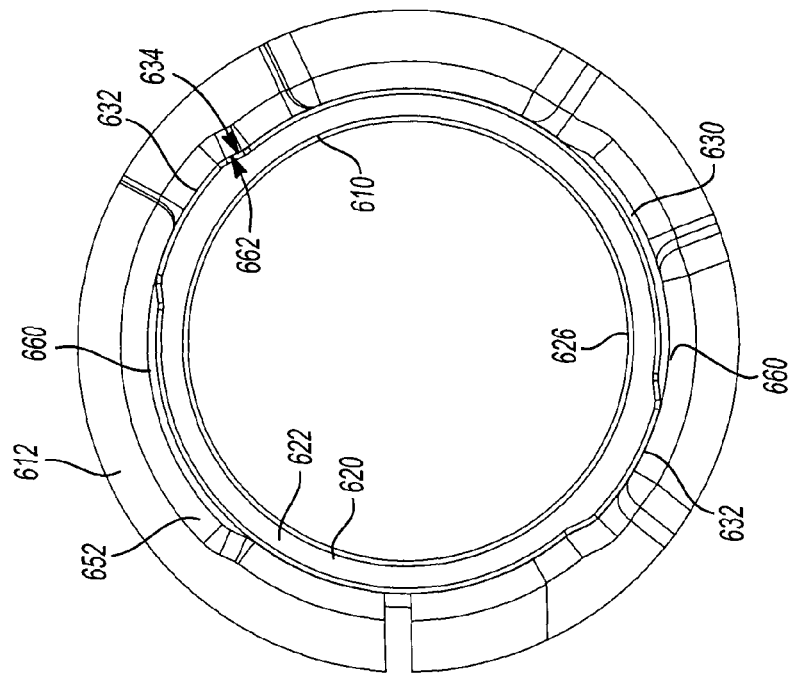
FIG. 21 is a front plan view of the bushing and spring support of FIG. 20 shown in an assembled position.
Figure 24:
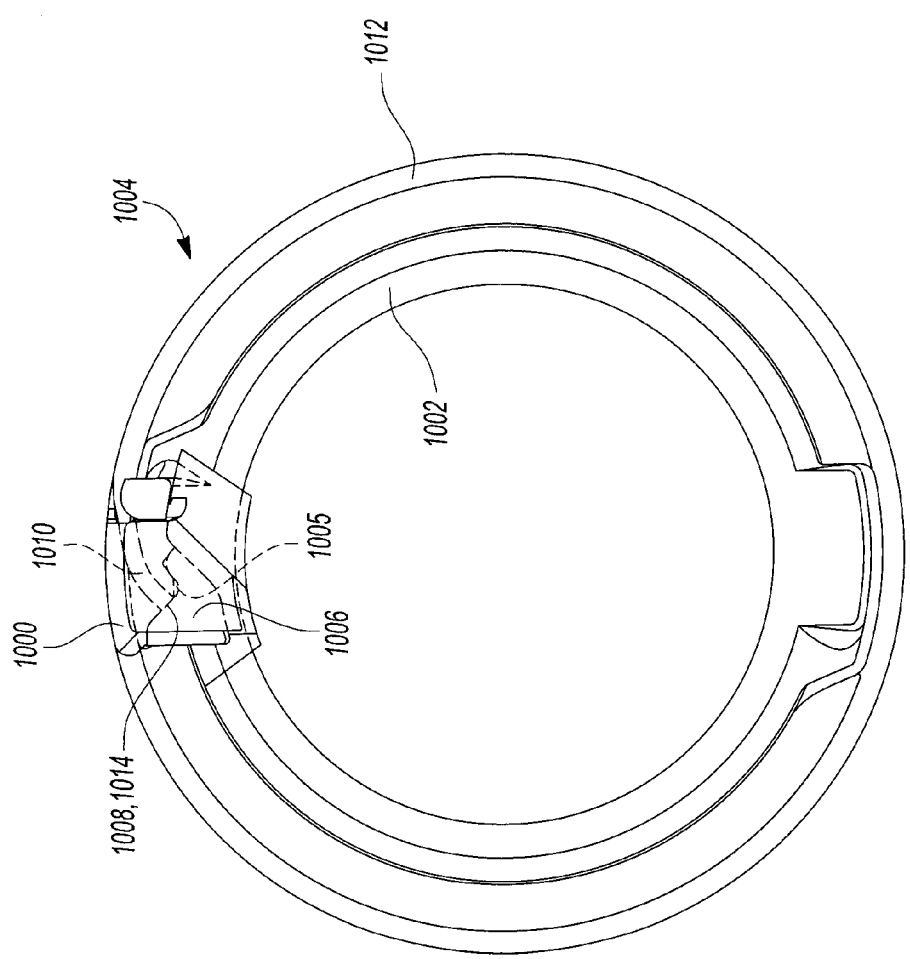
FIGS. 24 and 25 are section views of the portion of the overrunning decoupler of FIG. 23 illustrating a carrier as mounting to a carrier member.
Figure 25:
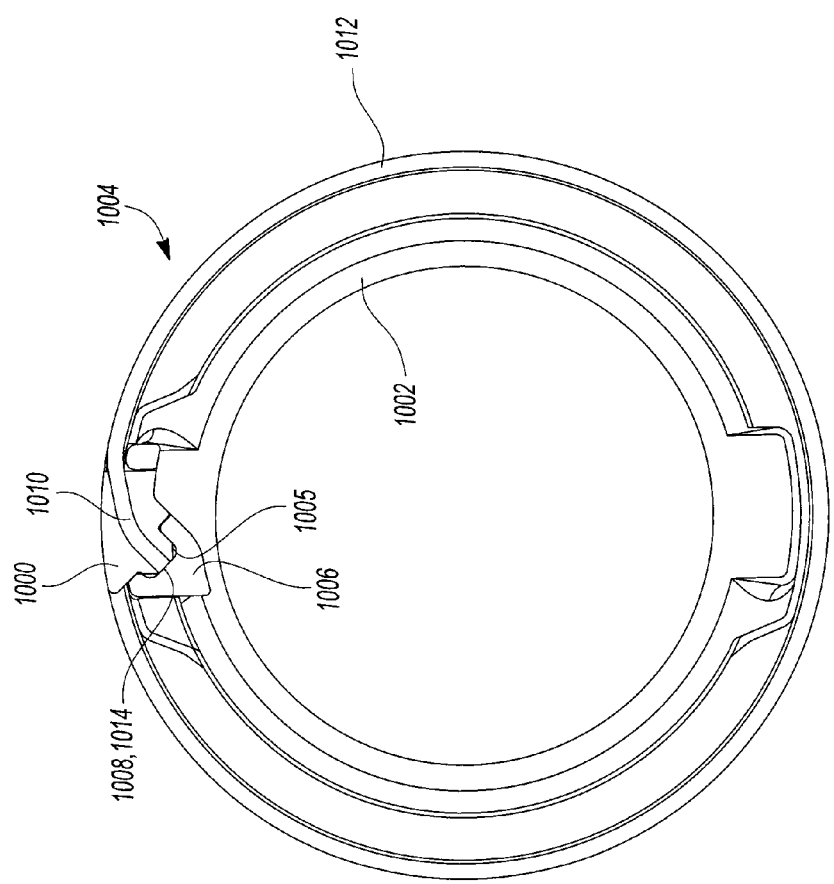
Figure 26:
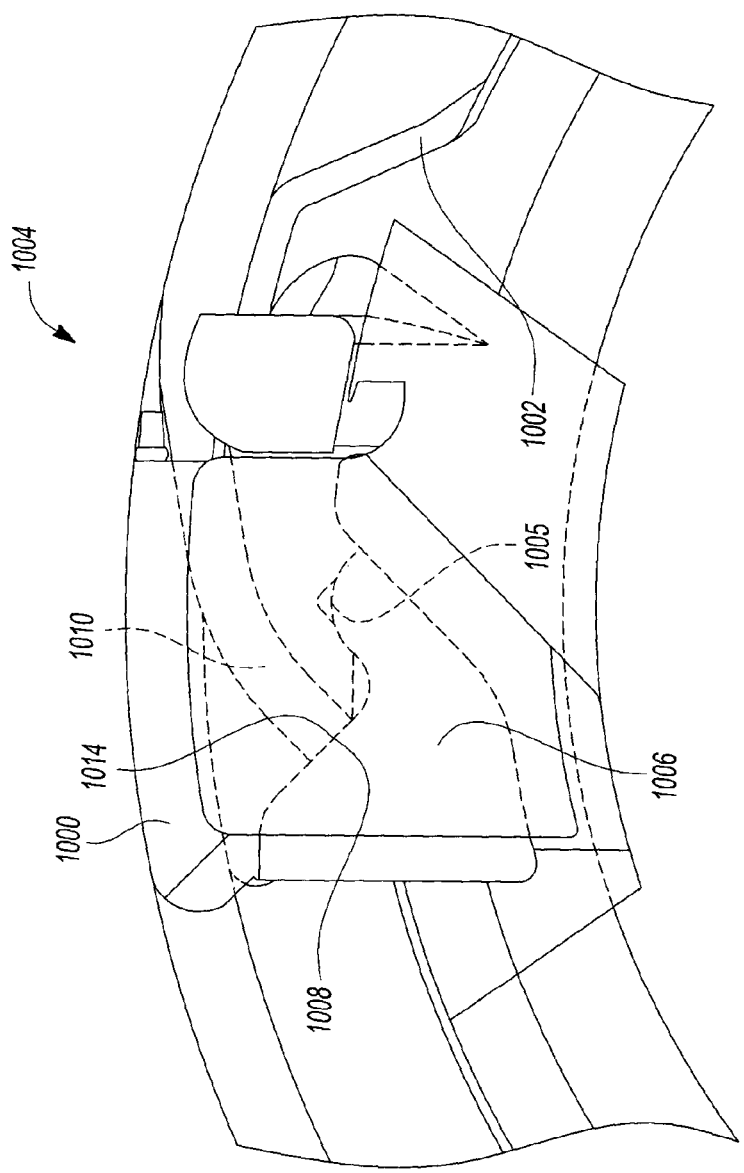
FIG. 26 is an enlarged portion of FIG. 24.
Figure 27:
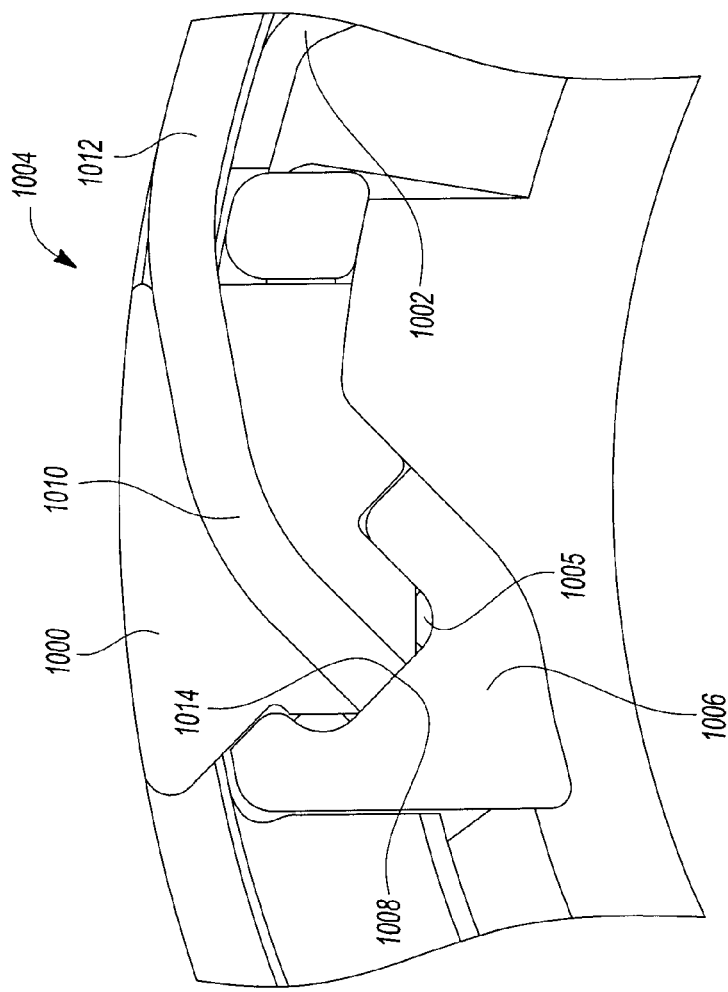
FIG. 27 is an enlarged portion of FIG. 25.

With reference now to FIG. 20, a bushing 610 and spring support 612 constructed in accordance to additional features of the present disclosure are shown. Unless otherwise described, the bushing 610 is configured similar to the other bushings described herein such as the bushing 44. Similarly, unless otherwise described, the spring support 612 may be constructed similar to the spring supports described herein such as the spring support 68. The bushing 610 can generally include a cylindrical body 620 that extends between a first end 622 (FIG. 21) and a second end 624 (FIG. 22). The body 620 can further comprise an inner cylindrical surface 626 and an outer cylindrical surface 630. The outer cylindrical surface 630 can include a pair of radial outset portions 632. Each radial outset portion 632 can include a ramped transition surface 634. As will become appreciated herein, the radial outset portions 632 are configured to selectively engage complementary structure formed on the spring support 612 to limit relative rotation between the bushing 610 and the spring support 612. The cylindrical body 620 can further define a plurality of pockets 640 formed into an inwardly extending radial sidewall 642 near the second end 624. The pockets 640 are configured to nestingly receive the radial projections 194 (FIG. 5) extending from the cylindrical sidewall 170 on the clutch housing 56 as described above.

The spring support 612 can generally include a cylindrical sidewall 650 that extends between a first end 652 (FIG. 21) and a second end 654 (FIG. 22). The cylindrical sidewall 650 can further include a pair of radial outset portions 660 that are configured to receive the radial outsets 632 formed on the bushing 610. The cylindrical sidewall 650 of the spring support 612 can include a ramped transition surface 662 formed at a transition to the radial outset portions 660. The ramped transition surface 662 of the spring support 612 is configured to engage the corresponding ramped transition surface 634 on the bushing 610 to preclude further rotation of the bushing 610 in the clockwise direction relative to the spring support 612 as viewed in FIG. 21. During operation, when the pulley 38 begins to overspeed the hub 36, the spring support 612 will cause the bushing 610 to rotate which in turn drives the clutch housing 56 by way of interaction of the projections 194 in the clutch housing and the pockets 640 of the bushing 610. In this regard, the torsion spring 66 is precluded from becoming wedged into the spring support 612 in the clutch housing 56. Furthermore, any metal to metal impacting is precluded.

According to other advantages, the torsion spring 66 is pre-loaded further contributing to reduced noise caused by potential component contact.

In view of the above discussion, it will be appreciated that the carrier of the present disclosure may be employed to directly transmit rotary power between any rotary component (e.g., a pulley or sprocket) and the foot (i.e., first end) of a wrap spring. In the example of FIGS. 23 through 27, the carrier 1000 is mounted in a carrier member 1002 in a decoupler 1004 that is generally similar to the decoupler that is disclosed in International Application WO 2010/099605, the disclosure of which is incorporated by reference as if fully set forth in detail herein. More specifically, the carrier member 1002 includes a spring reaction block 1006 and the carrier 1000 is received into a pocket 1005 in the spring reaction block 1006 such that the axial end face 1008 of the foot 1010 of the wrap spring 1012 is abutted against corresponding axial end face 1014 formed on the spring reaction block 1006. It will be appreciated that the axial end face 1014 is an edge of the pocket 1005. In the example provided the entire axial end face 1008 is in contact with a corresponding portion of the axial end face 1014.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof.

What is claimed is:

1. A decoupler comprising:
    a hub;
    a drive member that is configured to engage an endless power transmitting element; and
    a one-way clutch and torsionally resilient coupling having a carrier, a wrap spring, a clutch surface, and at least one spring, the carrier defining a groove, the wrap spring being formed of wire and having an engagement end and a plurality of helical coils, the engagement end being shorter in overall length than a length of one of the helical coils, the engagement end being received in the groove, the helical coils being engaged to the clutch surface and being wound such that the helical coils tend to uncoil against the clutch surface when rotary power is transmitted from a first one of the hub and the drive member to a second one of the hub and the drive member, wherein the carrier is received in a pocket formed in a rotary member selected from a group consisting of the hub, the drive member, and a component in a torque path between the hub and the drive member, wherein an axial end face of the wire that forms the wrap spring is abutted against an edge of the pocket when rotary power is transmitted from the first one of the hub and the drive member to the second one of the hub and the drive member so that at least a portion of the rotary power is transmitted between the axial end face of the wire that forms the wrap spring and the edge of the pocket.

2. The decoupler according to claim 1, wherein an annular retainer is fixedly coupled to the rotary member, the annular retainer is abutted to the carrier and is configured to limit movement of the carrier axially away from the rotary member so that the carrier does not move out of the pocket.

3. The decoupler according to claim 1, wherein the edge of the pocket extends along a first radially extending axis that intersects a rotational axis of the rotary member.

4. The decoupler according to claim 3, wherein an opposite edge of the pocket is defined by a second radially extending axis that intersects the rotational axis of the rotary member.

5. The decoupler according to claim 1, wherein the at least one spring consists of a single torsion spring that is disposed about a rotational axis of the hub.

6. The decoupler according to claim 1, wherein the at least one spring comprises a plurality of arcuate compression springs.

7. The decoupler according to claim 1, wherein the carrier is formed of plastic.

8. The decoupler according to claim 1, wherein the pocket is shaped as an annular segment.

9. The decoupler according to claim 1, wherein the engagement end of the wrap spring is held firmly by the carrier.

10. The decoupler according to claim 1, wherein the carrier is loose fit to the rotary member to allow the wrap spring some compliance.

11. The decoupler according to claim 1, wherein the carrier is configured to permit movement of the wrap spring to reduce bending moments and stress concentrations.

12. The decoupler according to claim 1, wherein the pocket extends less than 360 degrees about the rotary member.

13. The decoupler according to claim 1, further comprising a spring support that is fixed to the drive member for common rotation, wherein the at least one spring comprises a torsion spring that extends axially along a rotational axis of the hub, and wherein a first end of the torsion spring is drivingly coupled to the spring support.

14. The decoupler according to claim 13, further comprising a spring flange that is mounted to an axial end of the torsion spring opposite the spring support, and wherein a second end of the torsion spring is drivingly engaged to the spring flange.

15. The decoupler according to claim 13, wherein one of the spring flange and the spring support has a leg and wherein the other one of the spring flange and the spring support has a slotted aperture into which the leg is received, wherein the leg and the slotted aperture cooperate to limit rotation of the spring flange relative to the spring support.

* * * * *